(12) United States Patent
Park et al.

(10) Patent No.: US 9,158,091 B2
(45) Date of Patent: Oct. 13, 2015

(54) LENS MODULE

(71) Applicant: SAMSUNG ELECTRO-MECHANICS CO., LTD., Suwon (KR)

(72) Inventors: Il Yong Park, Suwon (KR); Yong Joo Jo, Suwon (KR); Young Suk Kang, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 19 days.

(21) Appl. No.: 14/135,418

(22) Filed: Dec. 19, 2013

(65) Prior Publication Data

US 2015/0055229 A1 Feb. 26, 2015

(30) Foreign Application Priority Data

Aug. 20, 2013 (KR) .................. 10-2013-0098761
Oct. 15, 2013 (KR) .................. 10-2013-0122611

(51) Int. Cl.
*G02B 9/62* (2006.01)
*G02B 13/00* (2006.01)

(52) U.S. Cl.
CPC .............. *G02B 9/62* (2013.01); *G02B 13/0045* (2013.01)

(58) Field of Classification Search
CPC .............. G02B 9/00; G02B 9/62; G02B 9/64
USPC .................... 359/708, 713, 754–757, 759
See application file for complete search history.

(56) References Cited

U.S. PATENT DOCUMENTS

| 8,477,431 B2 | 7/2013 | Huang | |
|---|---|---|---|
| 2008/0239515 A1 | 10/2008 | Asami | |
| 2012/0188654 A1 | 7/2012 | Huang | |
| 2013/0321932 A1 | 12/2013 | Hsu et al. | |
| 2014/0078603 A1* | 3/2014 | You | 359/738 |
| 2015/0029599 A1* | 1/2015 | Huang | 359/713 |

FOREIGN PATENT DOCUMENTS

| JP | 2008-250136 | 10/2008 |
|---|---|---|
| JP | 2011-85733 A | 4/2011 |
| JP | 2013-37202 | 2/2013 |
| TW | 201 239 444 | 10/2012 |

OTHER PUBLICATIONS

Office Action dated Sep. 21, 2014 for Korean Patent Application No. 10-2013-0122611 and its English summary provided by Applicant's foreign counsel.

(Continued)

*Primary Examiner* — Darryl J Collins
(74) *Attorney, Agent, or Firm* — NSIP Law

(57) ABSTRACT

There is provided a lens module including: a first lens having positive refractive power; a second lens having positive refractive power; a third lens having a shape in which an object-side surface thereof is concave; a fourth lens having refractive power; a fifth lens having negative refractive power; and a sixth lens having negative refractive power, having a shape in which an image-side surface thereof is concave, and having at least one point of inflection formed on the image-side surface thereof.

26 Claims, 24 Drawing Sheets

(56) References Cited

OTHER PUBLICATIONS

Extended European Search report dated Dec. 19, 2014 for European Patent Application No. 13275310.4.

Handbook of optical systems, Aberration theory and correction of optical systems, Chapter 31: Correction of Aberrations ED—Gross H, Jan. 1, 2007, Handbook of Optical Systems, Aberration Theory and Correction of Optical Systems, Wiley-VCH, Weinheim, DE, pp. 215-221,225, XP002719371, ISBN: 978-3-527-40379-0.

* cited by examiner

LENS MODULE

CROSS-REFERENCE TO RELATED APPLICATIONS

This application claims the benefit of Korean Patent Application No. 10-2013-0098761 filed on Aug. 20, 2013 and Korean Patent Application No. 10-2013-0122611 filed on Oct. 15, 2013, with the Korean Intellectual Property Office, the disclosures of which are incorporated in their entireties herein by reference.

BACKGROUND

The present disclosure relates to a lens module having an optical imaging system including six lenses.

Generally, a camera for a portable terminal includes a lens module and an imaging device.

Here, the lens module includes a plurality of lenses and includes an optical system configured using the plurality of lenses and projecting an image of a subject onto an imaging device. Here, the imaging device may be a device such as charge coupled device (CCD), or the like, and generally has a pixel size of 1.4 μm or more.

However, in accordance with a gradual decrease in portable terminal and camera module sizes, a pixel size of the imaging device has been decreased to 1.12 μm or less. Therefore, development of a lens module having a low F No. of 2.3 or less in which a high resolution may be implemented even under the above-mentioned conditions has been demanded.

For reference, as the related art associated with the present disclosure, there are provided Patent Documents 1 and 2. Patent Documents 1 and 2 disclose a lens module having an optical system including six lenses.

RELATED ART DOCUMENT (Patent Document 1) U.S. Pat. No. 8,477,431 B2
(Patent Document 2) US2012-0188654 A1

SUMMARY

An aspect of the present disclosure may provide a lens module capable of implementing an optical system having low F No. of 2.3 or less.

According to an aspect of the present disclosure, a lens module may include: a first lens having positive refractive power; a second lens having positive refractive power; a third lens having a shape in which an object-side surface thereof is concave; a fourth lens having refractive power; a fifth lens having negative refractive power; and a sixth lens having negative refractive power, having a shape in which an image-side surface thereof is concave, and having at least one point of inflection formed on the image-side surface thereof.

The fourth lens may have a shape in which an object-side surface thereof is convex.

An optical system including the first to sixth lenses may satisfy Conditional Equation 1:

$$0.3 < f12/f < 0.8 \quad \text{[Conditional Equation 1]}$$

where f12 may indicate a sum of focal lengths of the first and second lenses and f may indicate an overall focal length of the optical system.

An optical system including the first to sixth lenses may satisfy Conditional Equation 2:

$$(EPD/2)/f12 < 0.6 \quad \text{[Conditional Equation 2]}$$

where EPD may indicate an entrance pupil diameter and f12 may indicate a sum of focal lengths of the first and second lenses.

An optical system including the first to sixth lenses may satisfy Conditional Equation 3:

$$f5/f < -3.0 \quad \text{[Conditional Equation 3]}$$

where f5 may indicate a focal length of the fifth lens and f may indicate an overall focal length of the optical system.

An optical system including the first to sixth lenses may satisfy Conditional Equation 4:

$$|V1-V5| > 25 \quad \text{[Conditional Equation 4]}$$

where V1 may indicate an Abbe number of the first lens and V5 may indicate an Abbe number of the fifth lens.

An optical system including the first to sixth lenses may satisfy Conditional Equation 5:

$$TTL/f < 1.4 \quad \text{[Conditional Equation 5]}$$

where TTL may indicate a distance from an object-side surface of the first lens to an image surface.

An optical system including the first to sixth lenses may satisfy Conditional Equation 6:

$$0.5 < f1/f2 < 2.2 \quad \text{[Conditional Equation 6]}$$

where f1 may indicate a focal length of the first lens and f2 may indicate a focal length of the second lens.

An optical system including the first to sixth lenses may satisfy Conditional Equation 7:

$$BFL/f > 0.15 \quad \text{[Conditional Equation 7]}$$

where BFL may indicate a distance from the image-side surface of the sixth lens to an image surface and f may indicate an overall focal length of the optical system.

An optical system including the first to sixth lenses may satisfy Conditional Equation 8:

$$r1/f > 0.2 \quad \text{[Conditional Equation 8]}$$

where r1 may indicate a radius of curvature of an object-side surface of the first lens and f may indicate an overall focal length of the optical system.

An optical system including the first to sixth lenses may satisfy Conditional Equation 9:

$$(r5+r6)/(r5-r6) > (r7+r8)/(r7-r8) \quad \text{[Conditional Equation 9]}$$

where r5 and r6 may indicate radii of curvature of the object-side surface and an image-side surface of the third lens, respectively, and r7 and r8 may indicate radii of curvature of an object-side surface and an image-side surface of the fourth lens, respectively.

According to another aspect of the present disclosure, a lens module may include: a first lens having positive refractive power; a second lens having positive refractive power; a third lens having negative refractive power; a fourth lens having refractive power and having a shape in which an object-side surface thereof is convex; a fifth lens having negative refractive power; and a sixth lens having negative refractive power, having a shape in which an image-side surface thereof is concave, and having at least one point of inflection formed on the image-side surface thereof.

The first lens may have a meniscus shape in which it is convex toward an object.

The second lens may have a shape in which both surfaces thereof are convex.

The third lens may have a shape in which both surfaces thereof are concave.

The fourth lens may have positive refractive power.

The fifth lens may have a meniscus shape in which it is convex toward an image.

The sixth lens may have a shape in which an object-side surface thereof is convex and the image-side surface thereof is concave.

An optical system including the first to sixth lenses may satisfy Conditional Equation 1:

$$0.3 < f12/f < 0.8 \quad \text{[Conditional Equation 1]}$$

where f12 may indicate a sum of focal lengths of the first and second lenses and f may indicate an overall focal length of the optical system.

An optical system including the first to sixth lenses may satisfy Conditional Equation 2:

$$(EPD/2)/f12 < 0.6 \quad \text{[Conditional Equation 2]}$$

where EPD may indicate an entrance pupil diameter and f12 may indicate a sum of focal lengths of the first and second lenses.

An optical system including the first to sixth lenses may satisfy Conditional Equation 3:

$$f5/f < -3.0 \quad \text{[Conditional Equation 3]}$$

where f5 may indicate a focal length of the fifth lens and f may indicate an overall focal length of the optical system.

An optical system including the first to sixth lenses may satisfy Conditional Equation 4:

$$|V1 - V5| > 25 \quad \text{[Conditional Equation 4]}$$

where V1 may indicate an Abbe number of the first lens and V5 may indicate an Abbe number of the fifth lens.

An optical system including the first to sixth lenses may satisfy Conditional Equation 5:

$$TTL/f < 1.4 \quad \text{[Conditional Equation 5]}$$

where TTL may indicate a distance from an object-side surface of the first lens to an image surface.

An optical system including the first to sixth lenses may satisfy Conditional Equation 6:

$$0.5 < f1/f2 < 2.2 \quad \text{[Conditional Equation 6]}$$

where f1 may indicate a focal length of the first lens and f2 may indicate a focal length of the second lens.

An optical system including the first to sixth lenses may satisfy Conditional Equation 7:

$$BFL/f > 0.15 \quad \text{[Conditional Equation 7]}$$

where BFL may indicate a distance from the image-side surface of the sixth lens to an image surface and f may indicate an overall focal length of the optical system.

An optical system including the first to sixth lenses may satisfy Conditional Equation 8:

$$r1/f > 0.2 \quad \text{[Conditional Equation 8]}$$

where r1 may indicate a radius of curvature of an object-side surface of the first lens and f may indicate an overall focal length of the optical system.

An optical system including the first to sixth lenses may satisfy Conditional Equation 9:

$$(r5+r6)/(r5-r6) > (r7+r8)/(r7-r8) \quad \text{[Conditional Equation 9]}$$

where r5 and r6 may indicate radii of curvature of an object-side surface and an image-side surface of the third lens, respectively, and r7 and r8 may indicate radii of curvature of the object-side surface and an image-side surface of the fourth lens, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In addition, in the present specification, a first lens means a lens that is the closest to an object side, and a sixth lens means a lens that is the closest to an image side. Further, a front side means a side of a lens module close to the object side, and a rear side means a side of the lens module close to the an image sensor. In addition, a first surface of each lens means a surface close to the object side (or an object-side surface), and a second surface of each lens means a surface close to the image side (or an image-side surface). Further, in the present specification, units of all of radii, thicknesses, through-the-lenses (TTLs), entrance pupil diameters (EPDs), and over all lengths (OALs) of the lenses, an overall focal length of the optical system, and a focal length of each lens may be mm.

Figure 1:
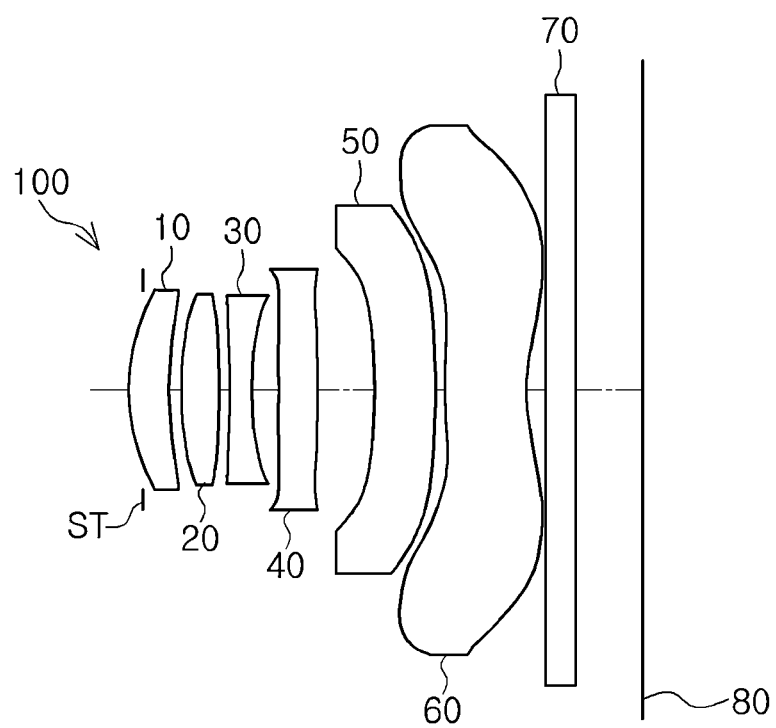
FIG. 1 is a configuration diagram of a lens module according to an exemplary embodiment of the present disclosure.
Figure 2:
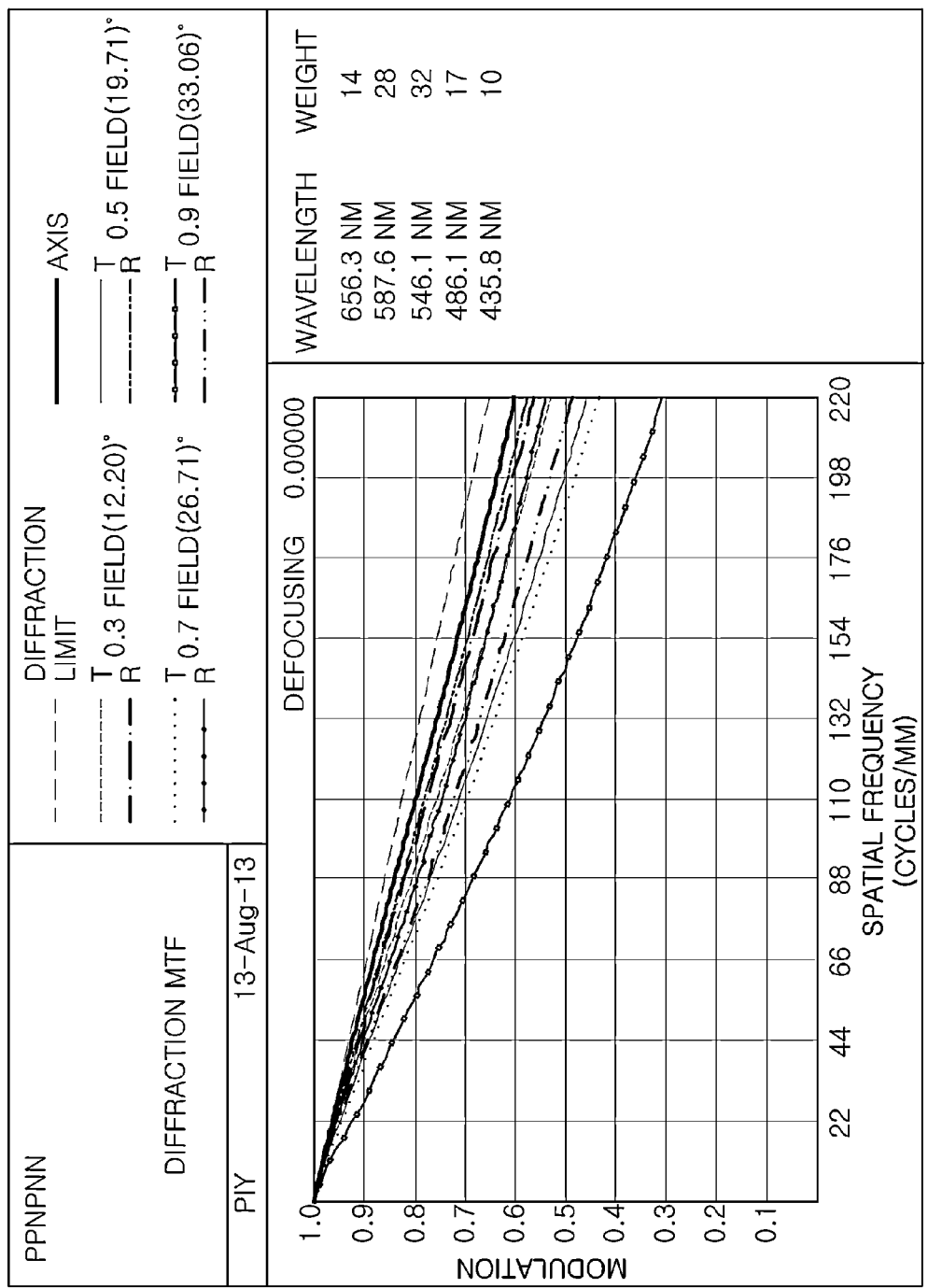
FIG. 2 is a curve showing a modulation transfer function (MTF) of the lens module illustrated in FIG. 1.
Figure 3:
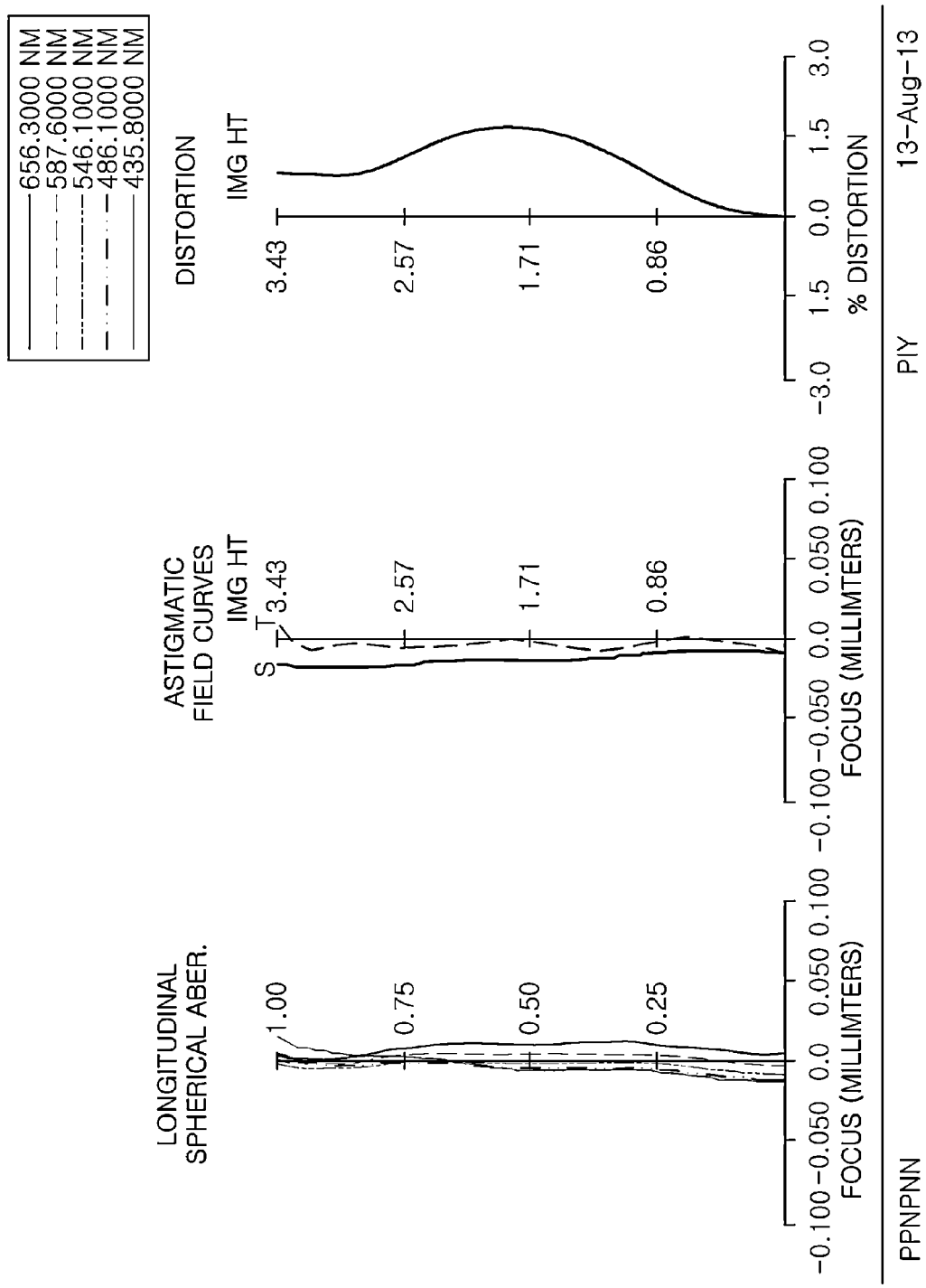
FIG. 3 is a curve showing aberration characteristics of the lens module illustrated in FIG. 1.
Figure 4:
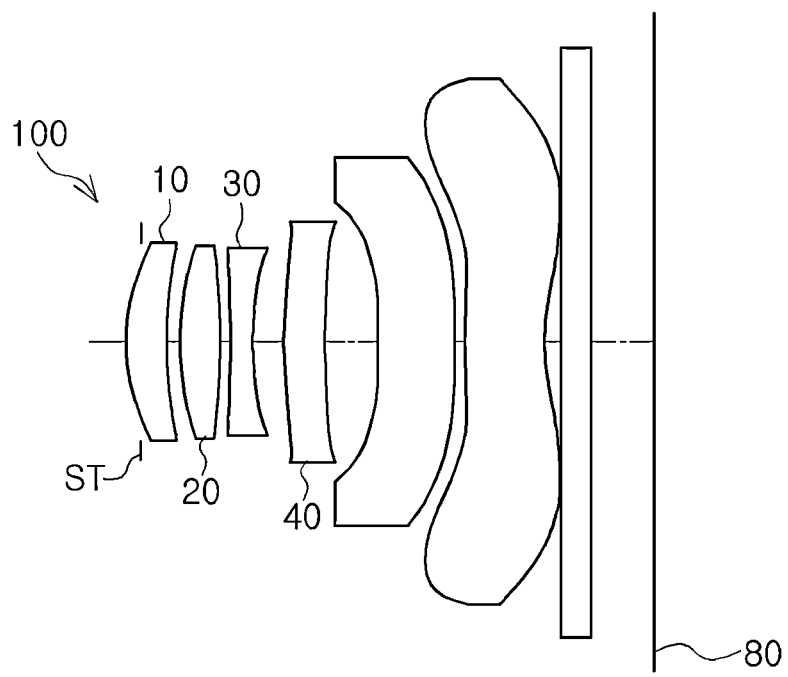
FIG. 4 is a configuration diagram of a lens module according to another exemplary embodiment of the present disclosure.
Figure 5:
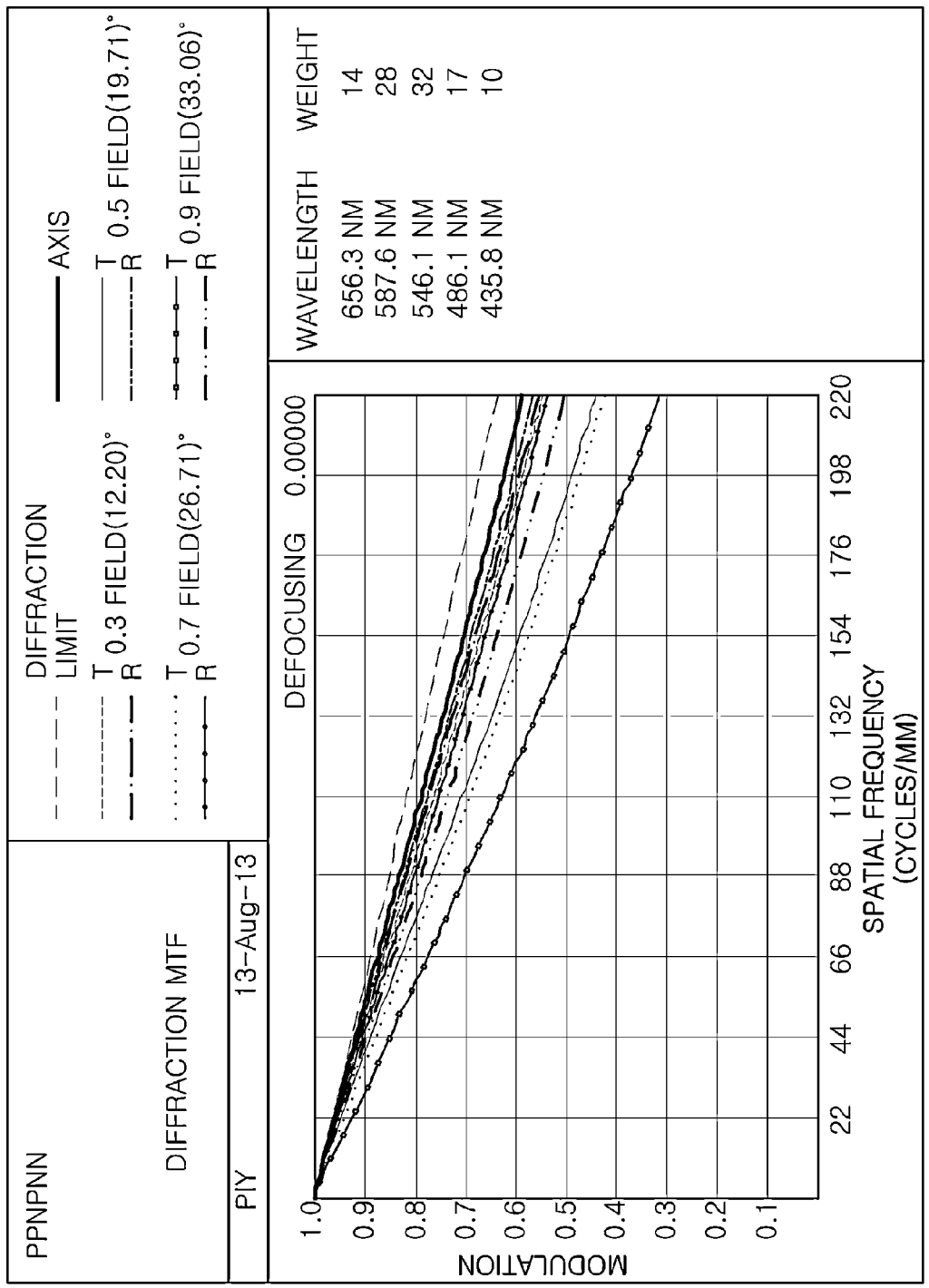
FIG. 5 is a curve showing an MTF of the lens module illustrated in FIG. 4.
Figure 6:
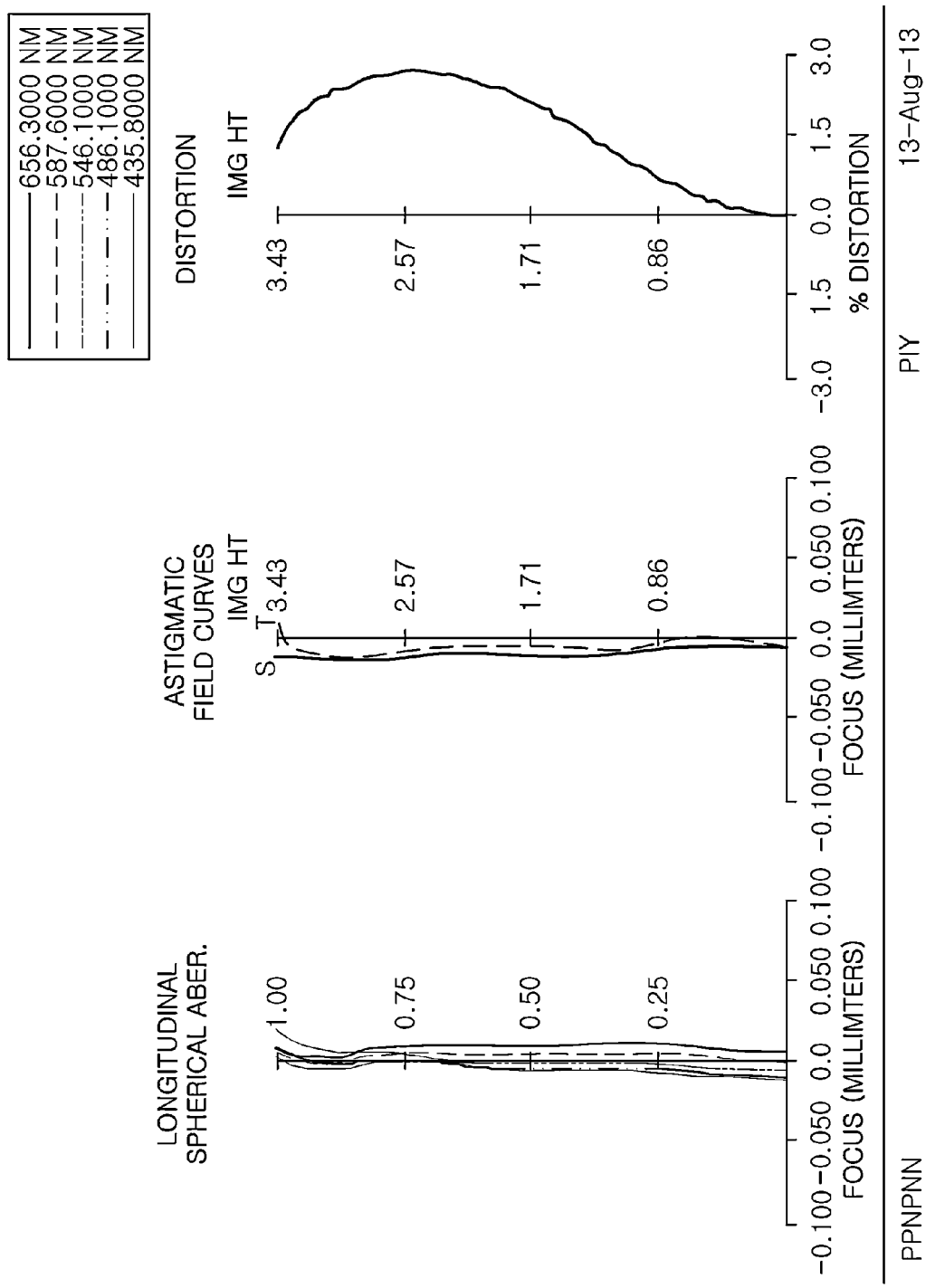
FIG. 6 is a curve showing aberration characteristics of the lens module illustrated in FIG. 4.
Figure 7:
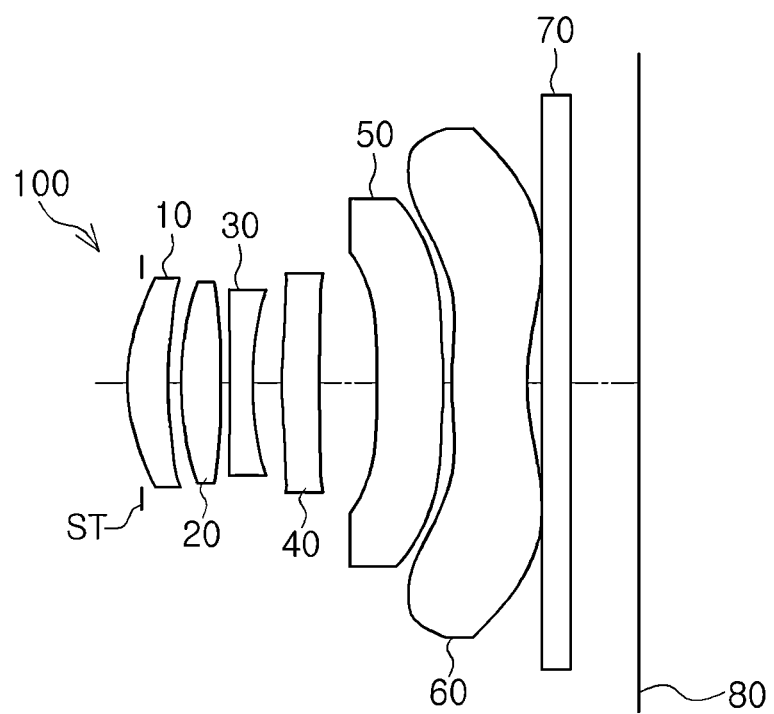
FIG. 7 is a configuration diagram of a lens module according to another exemplary embodiment of the present disclosure.
Figure 8:
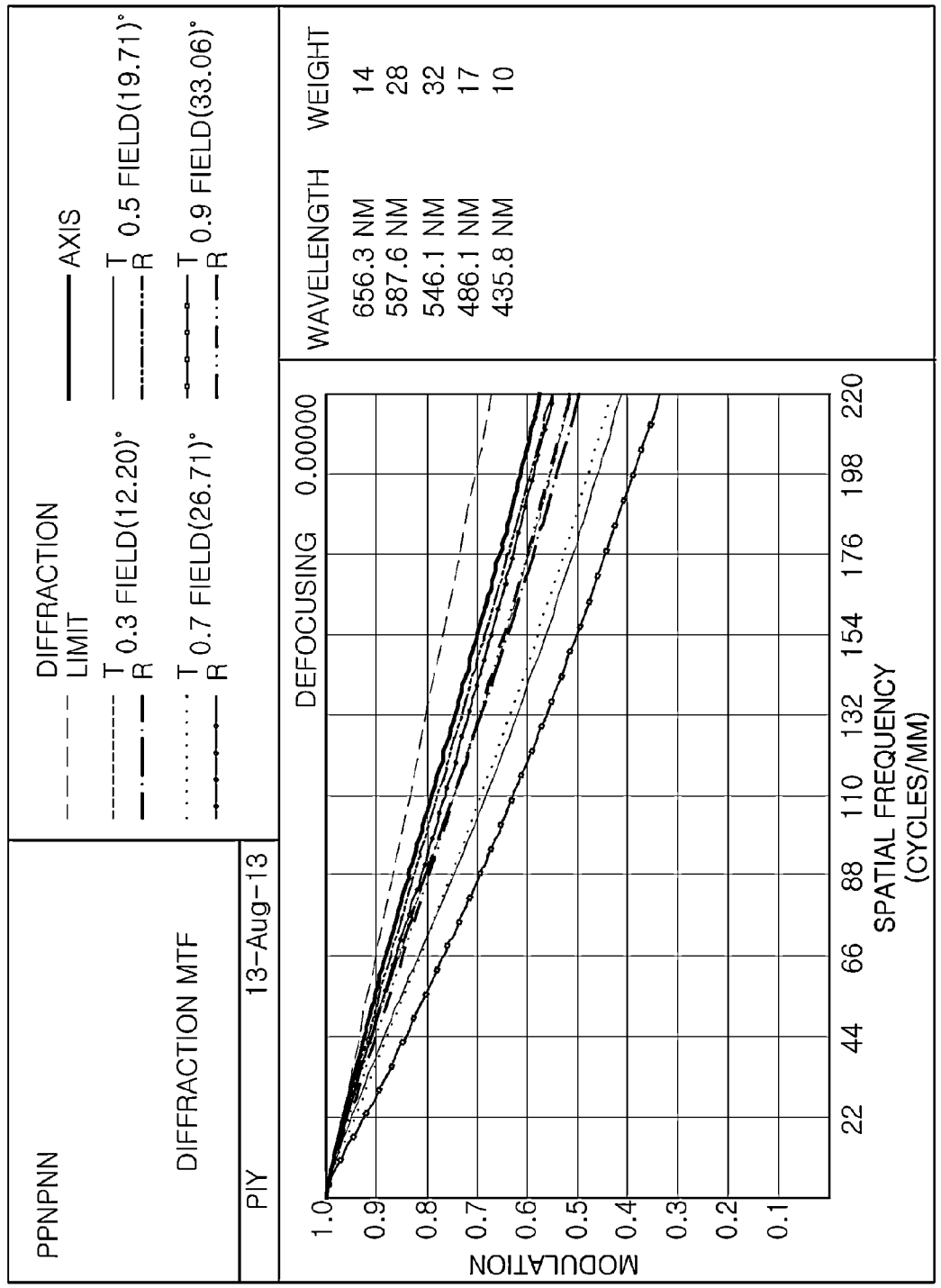
FIG. 8 is a curve showing an MTF of the lens module illustrated in FIG. 7.
Figure 9:
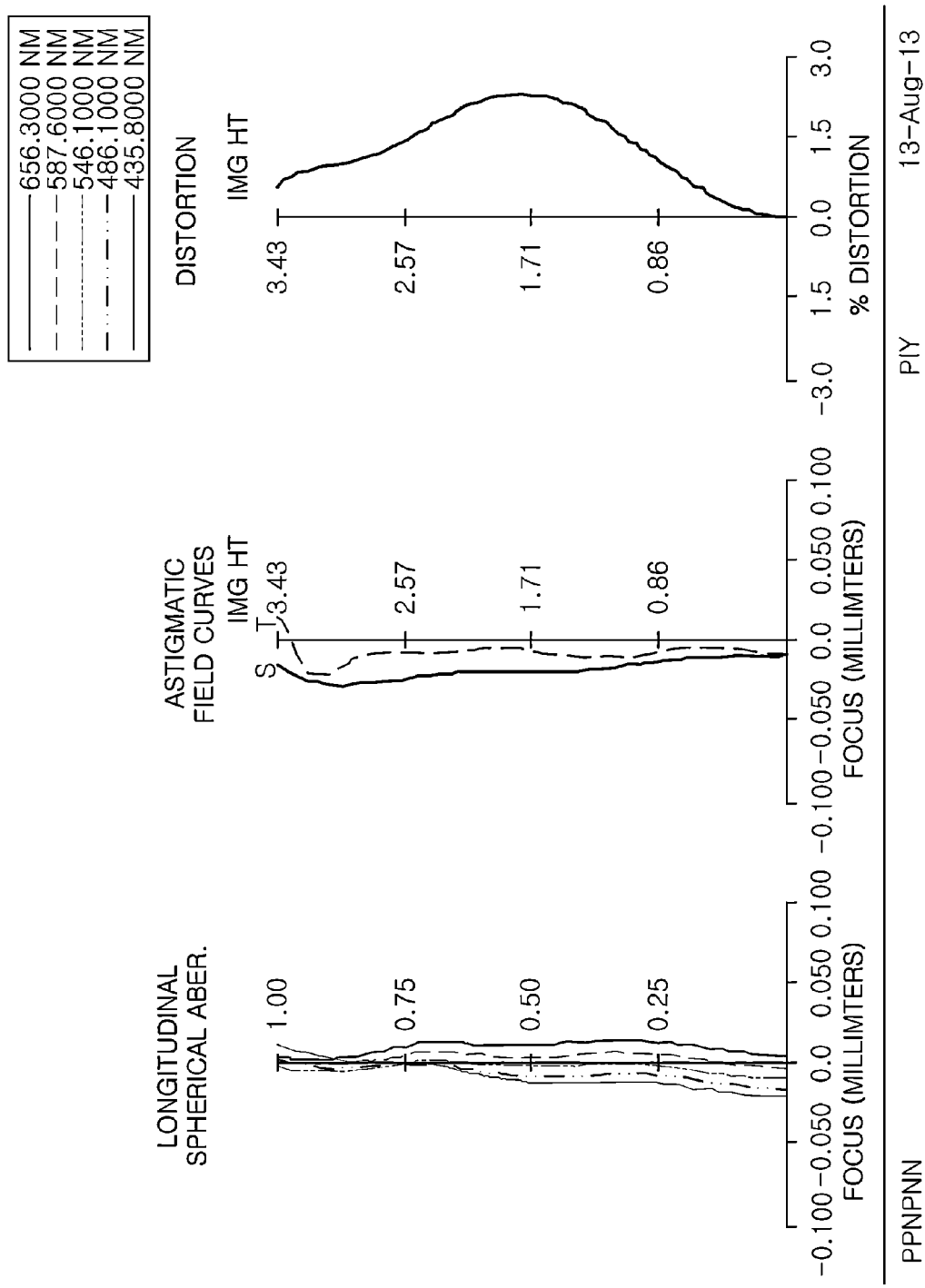
FIG. 9 is a curve showing aberration characteristics of the lens module illustrated in FIG. 7.
Figure 10:
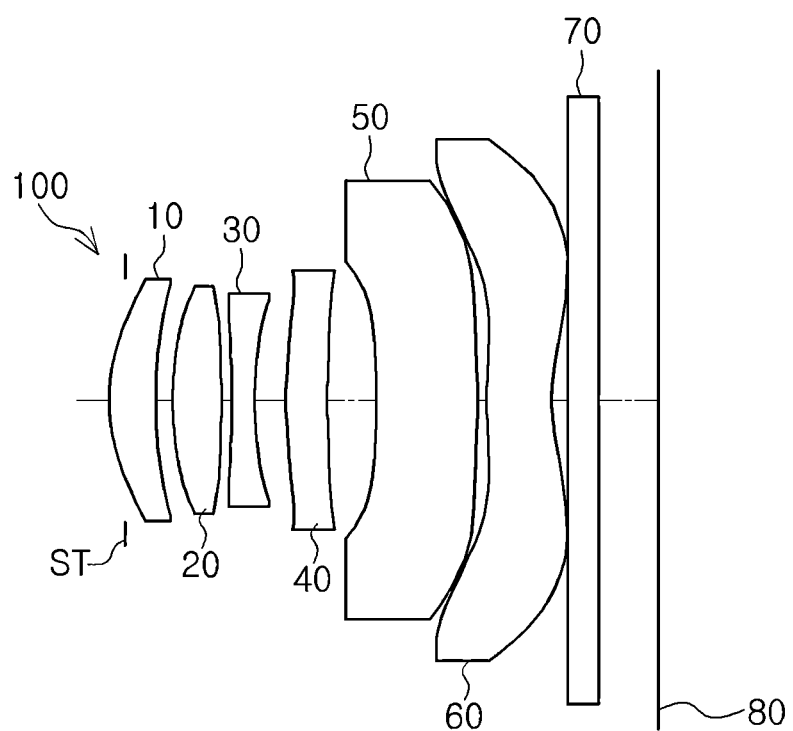
FIG. 10 is a configuration diagram of a lens module according to another exemplary embodiment of the present disclosure.
Figure 11:
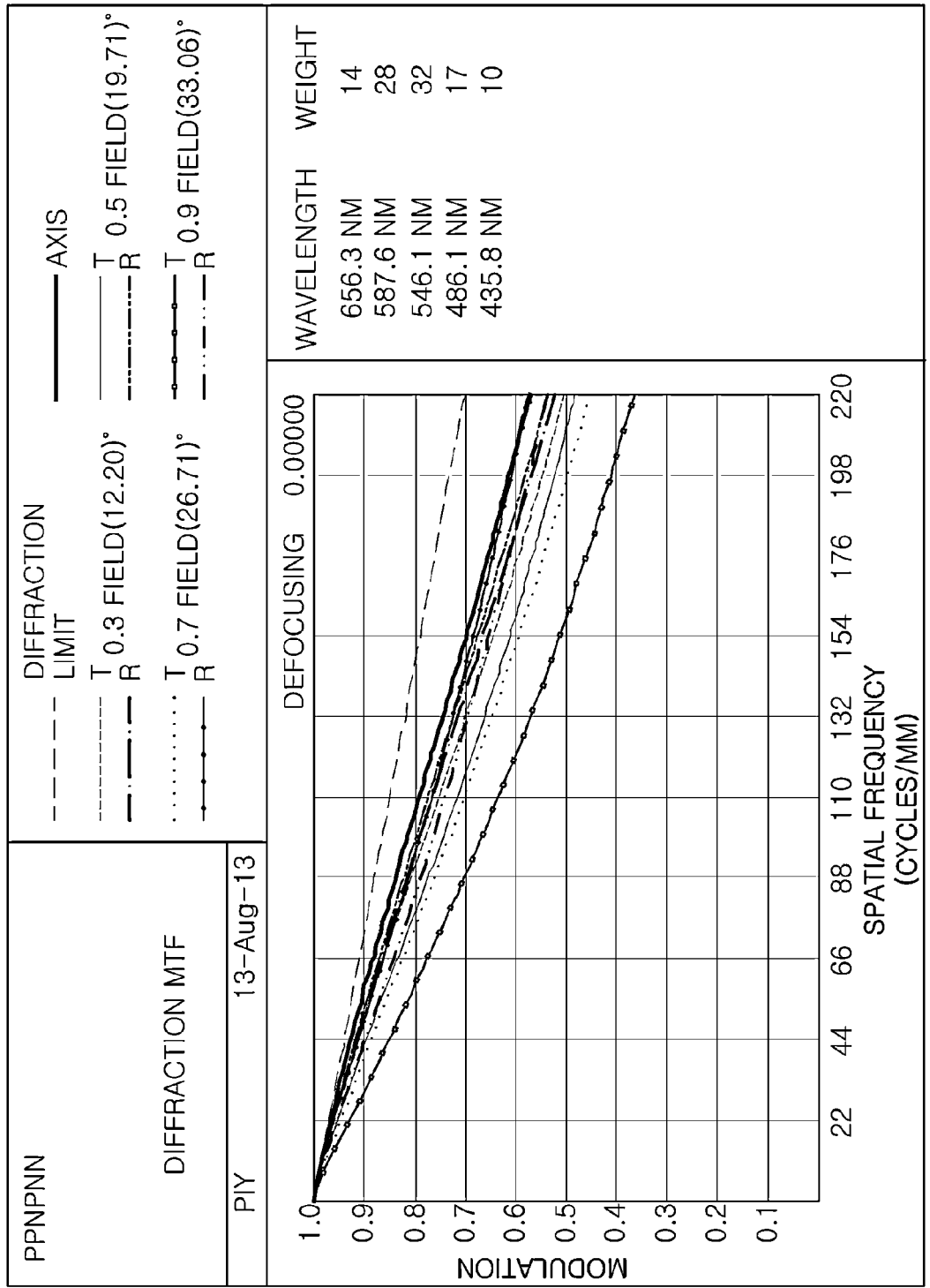
FIG. 11 is a curve showing an MTF of the lens module illustrated in FIG. 10.
Figure 12:
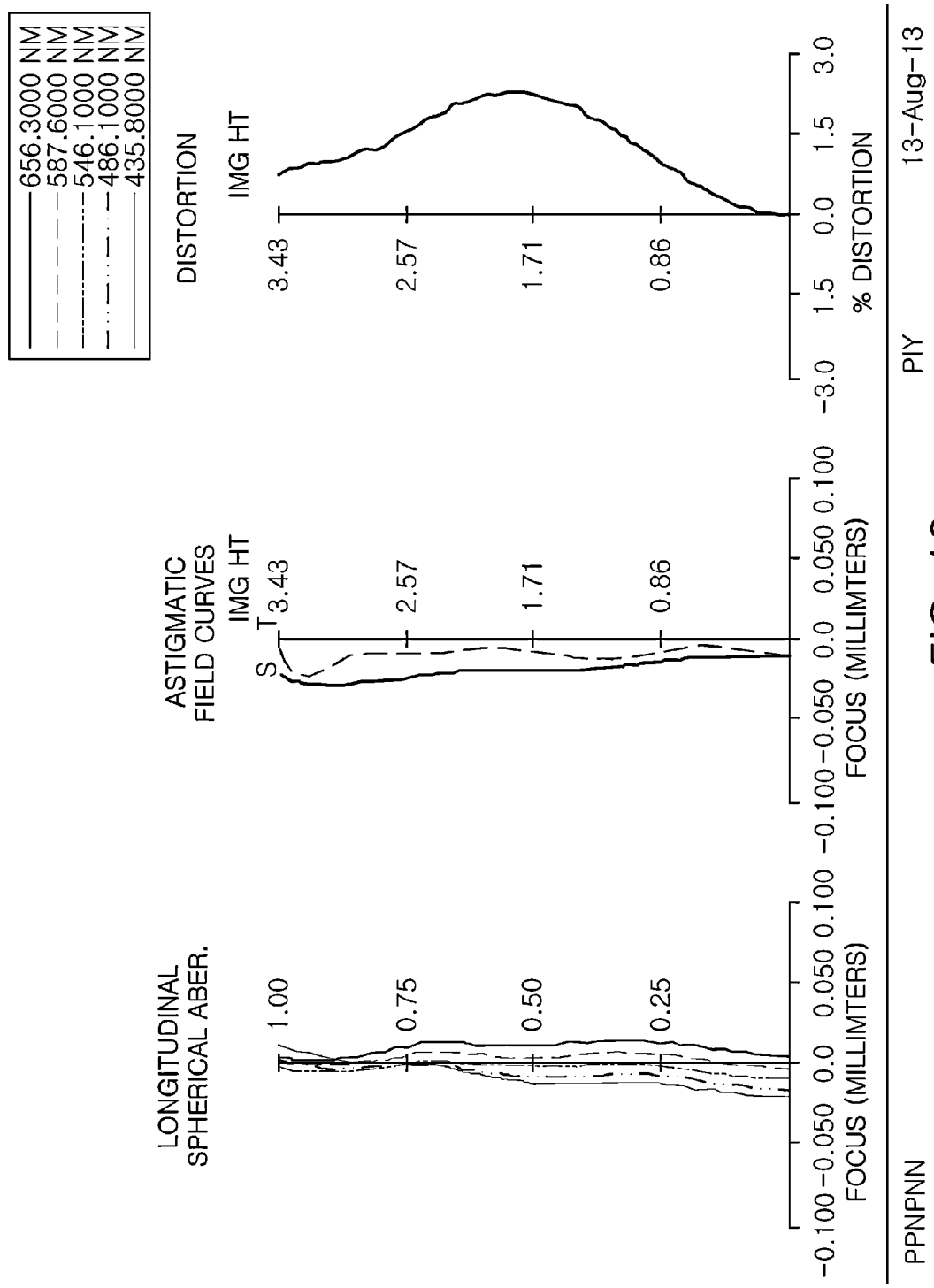
FIG. 12 is a curve showing aberration characteristics of the lens module illustrated in FIG. 10.
Figure 13:
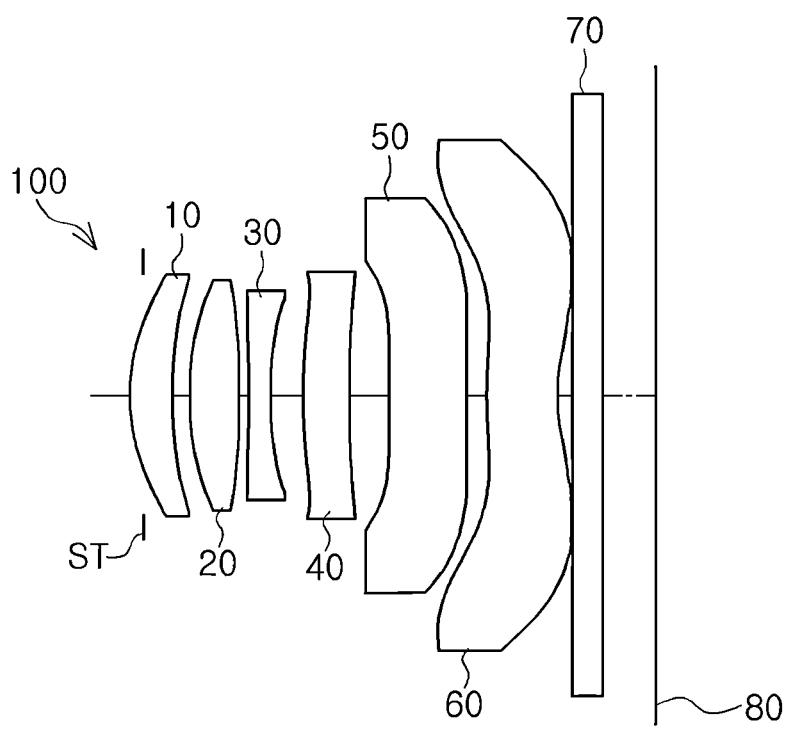
FIG. 13 is a configuration diagram of a lens module according to another exemplary embodiment of the present disclosure.
Figure 14:
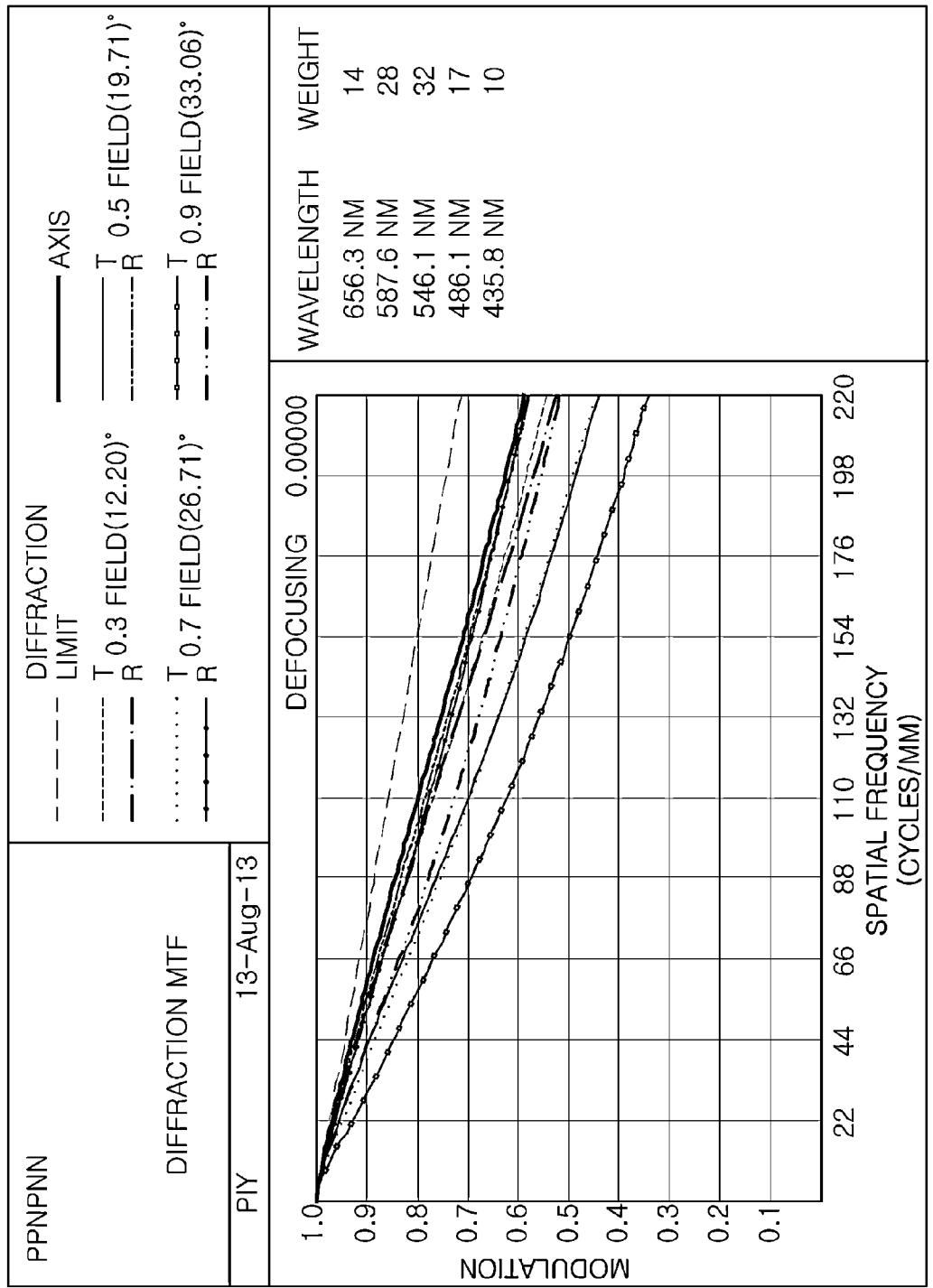
FIG. 14 is a curve showing an MTF of the lens module illustrated in FIG. 13.
Figure 15:
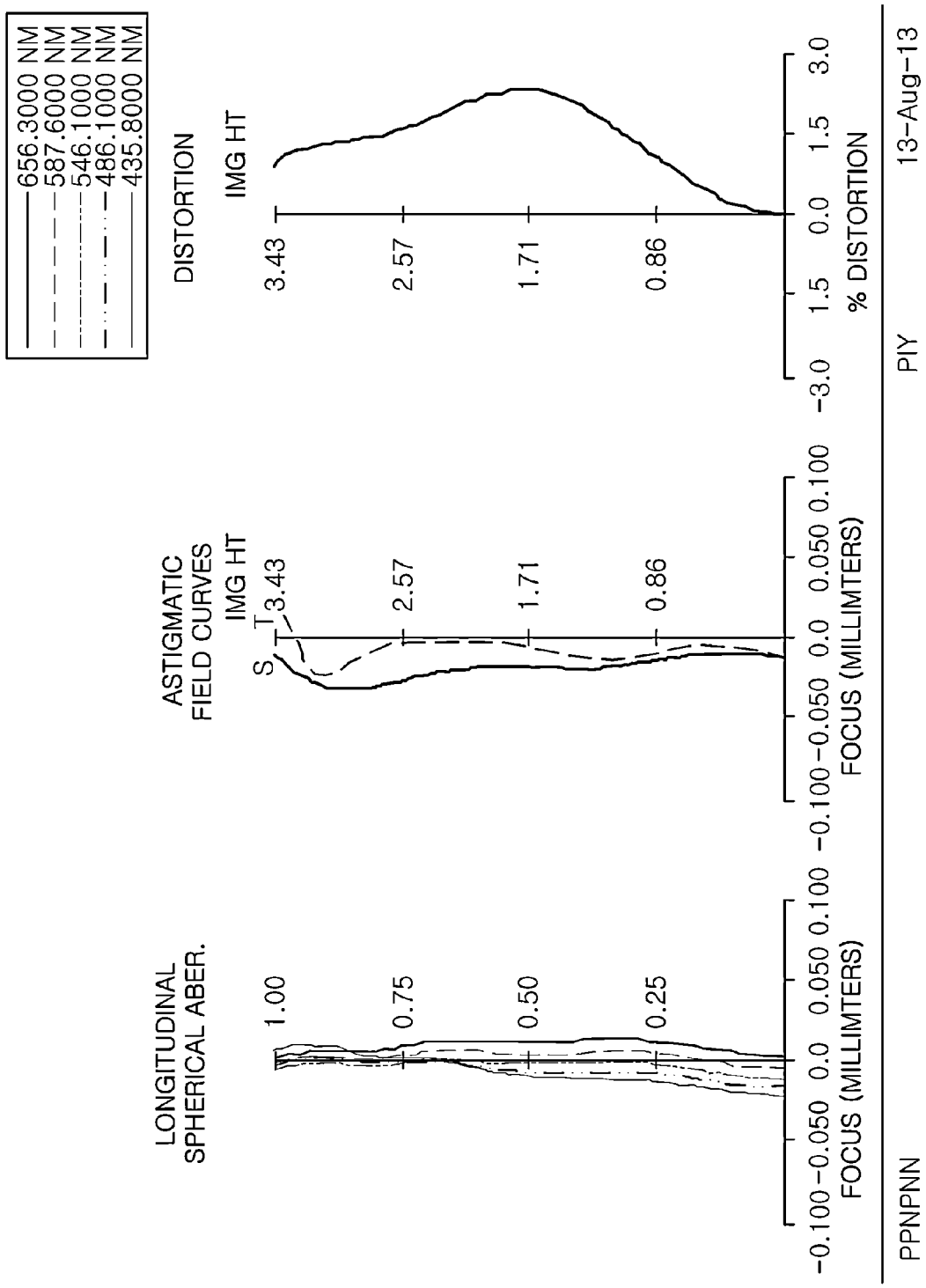
FIG. 15 is a curve showing aberration characteristics of the lens module illustrated in FIG. 13.
Figure 16:
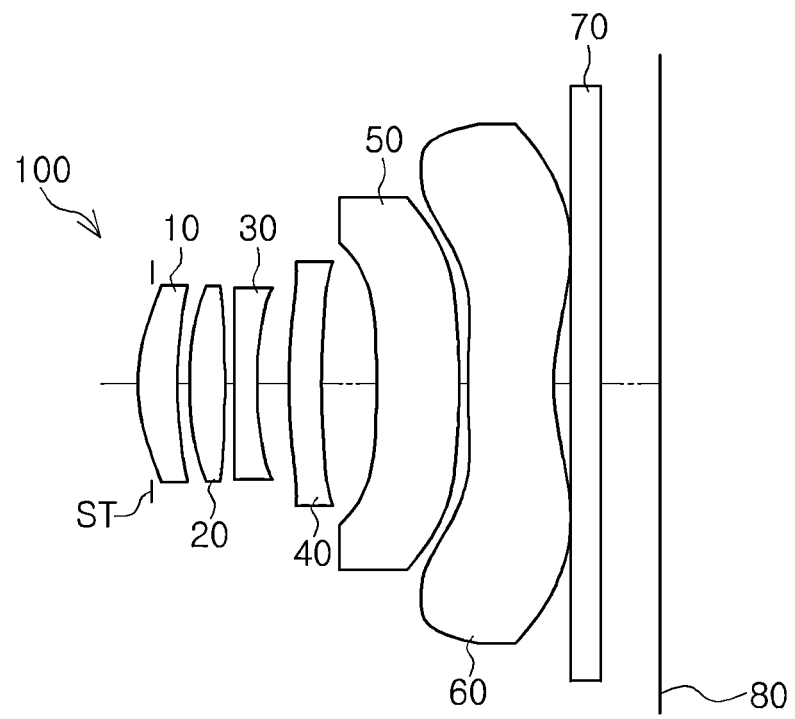
FIG. 16 is a configuration diagram of a lens module according to another exemplary embodiment of the present disclosure.
Figure 17:
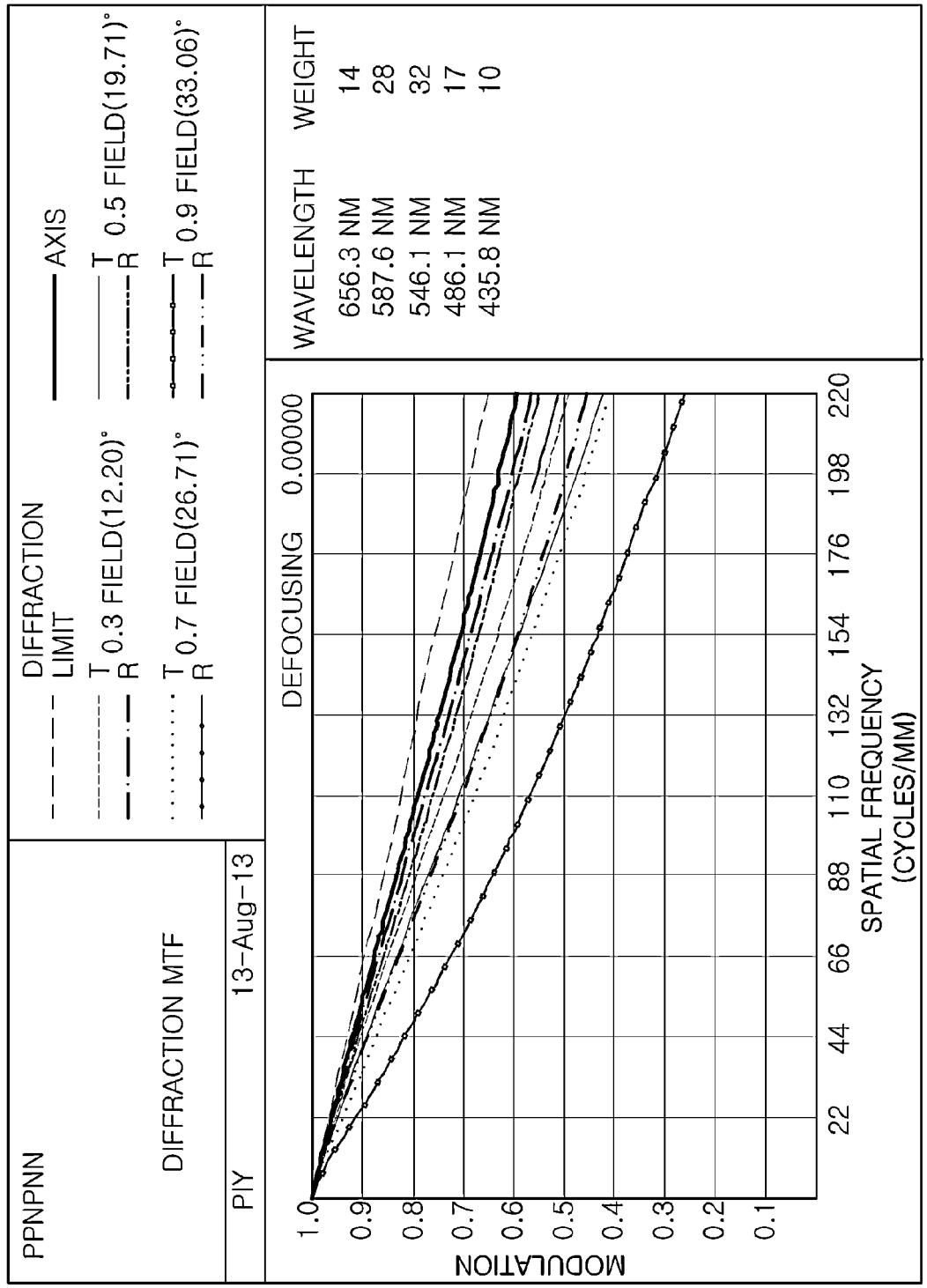
FIG. 17 is a curve showing an MTF of the lens module illustrated in FIG. 16.
Figure 18:
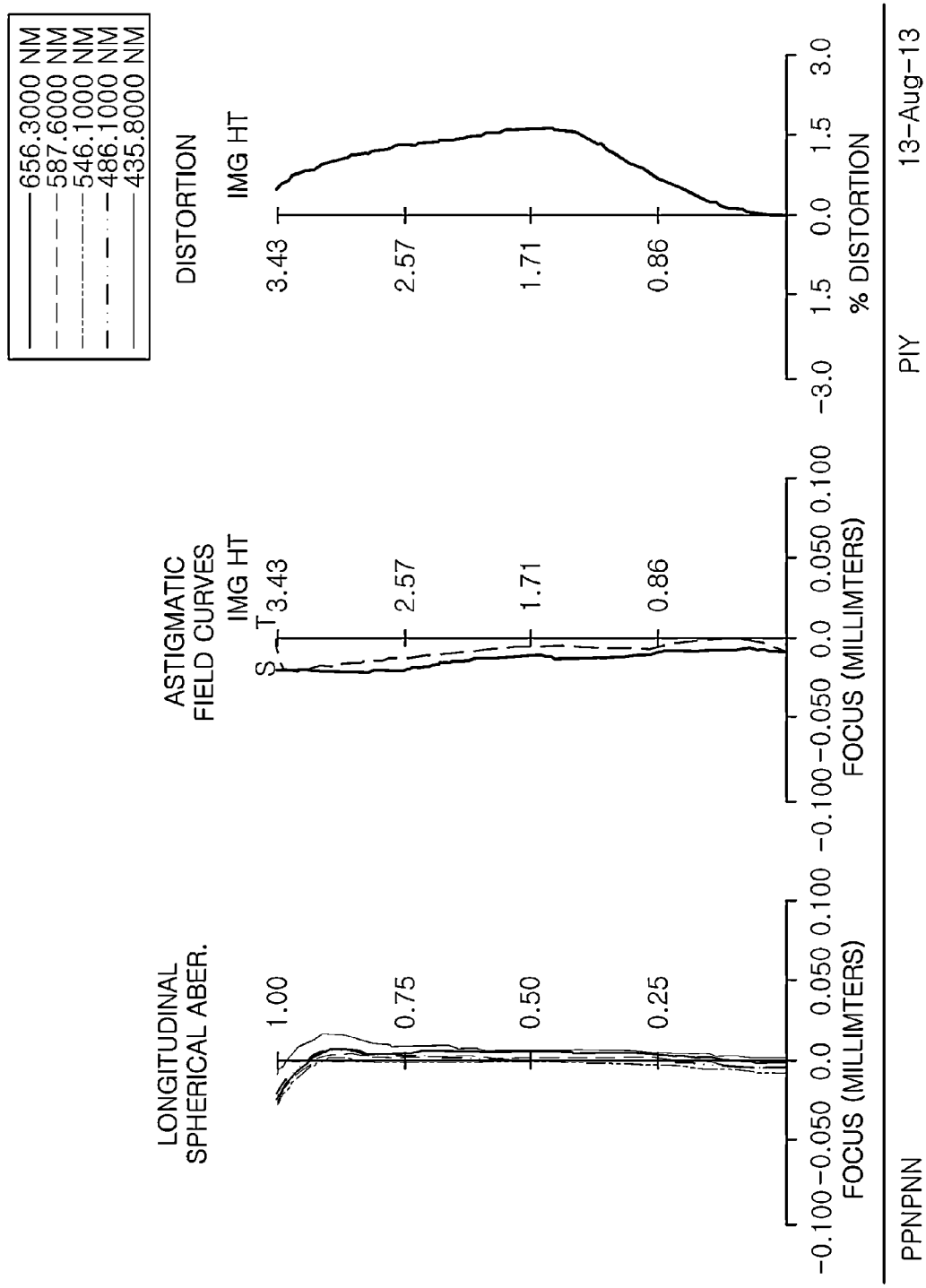
FIG. 18 is a curve showing aberration characteristics of the lens module illustrated in FIG. 16.
Figure 19:
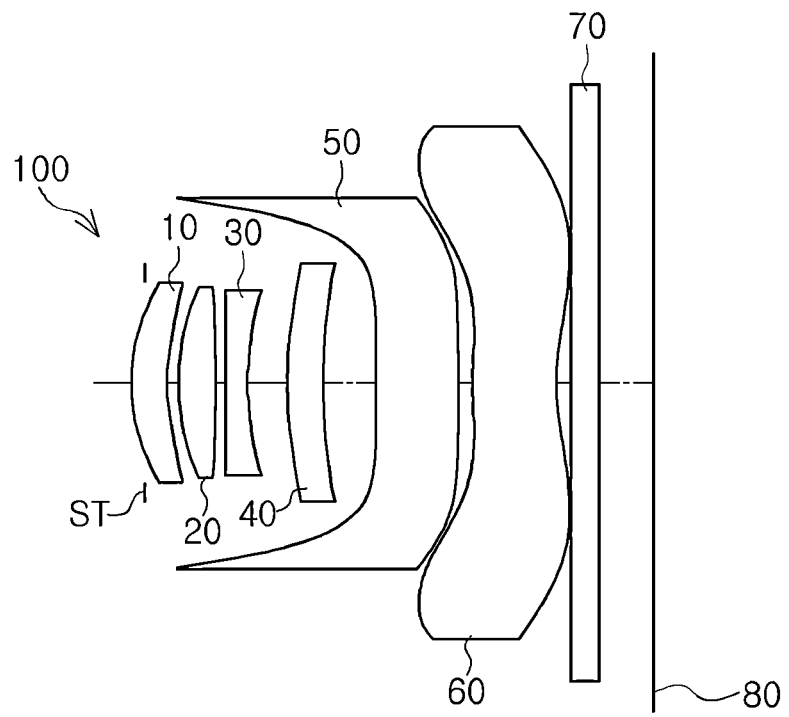
FIG. 19 is a configuration diagram of a lens module according to another exemplary embodiment of the present disclosure.
Figure 20:
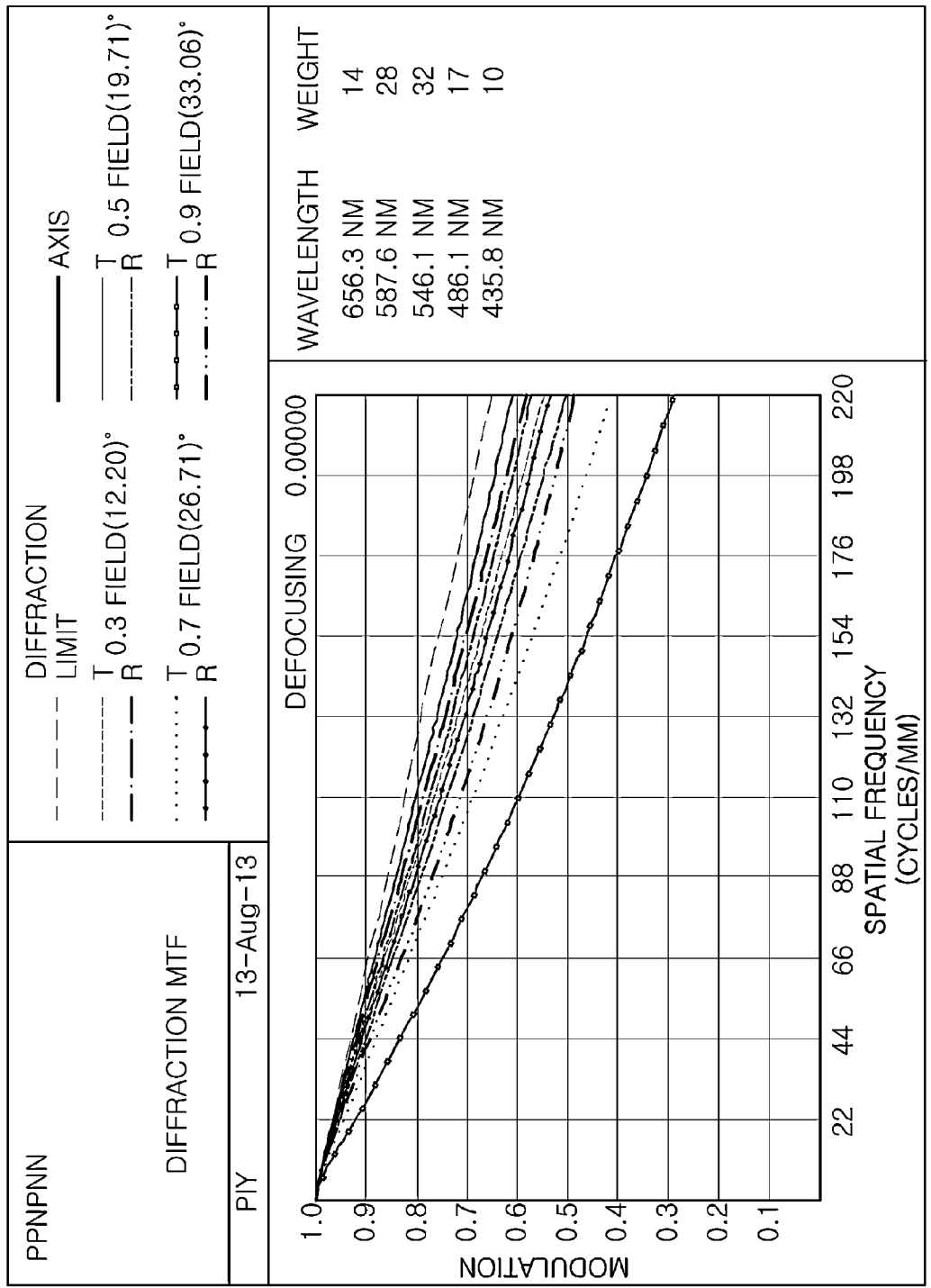
FIG. 20 is a curve showing an MTF of the lens module illustrated in FIG. 19.
Figure 21:
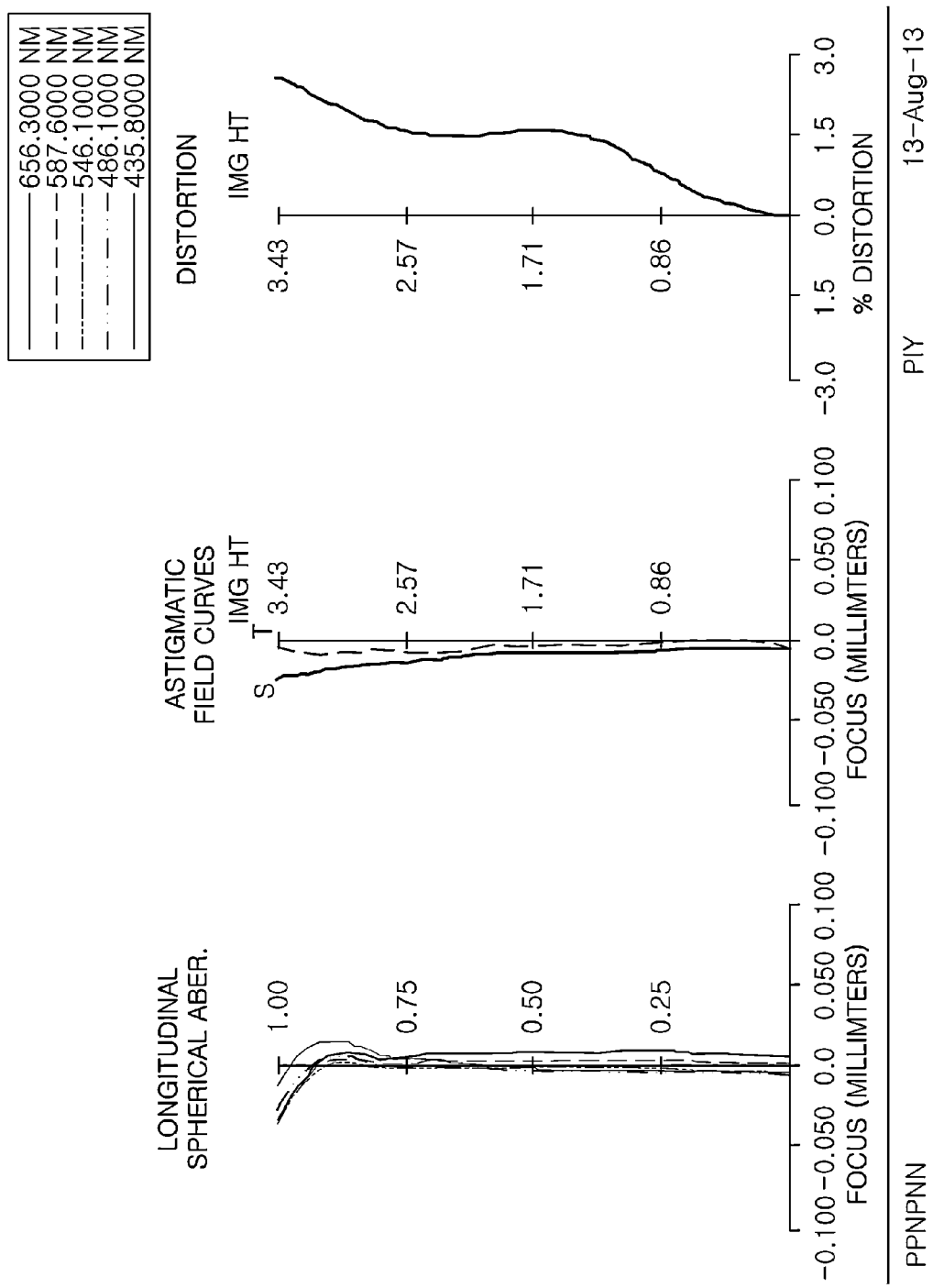
FIG. 21 is a curve showing coma aberration characteristics of the lens module illustrated in FIG. 19.
Figure 22:
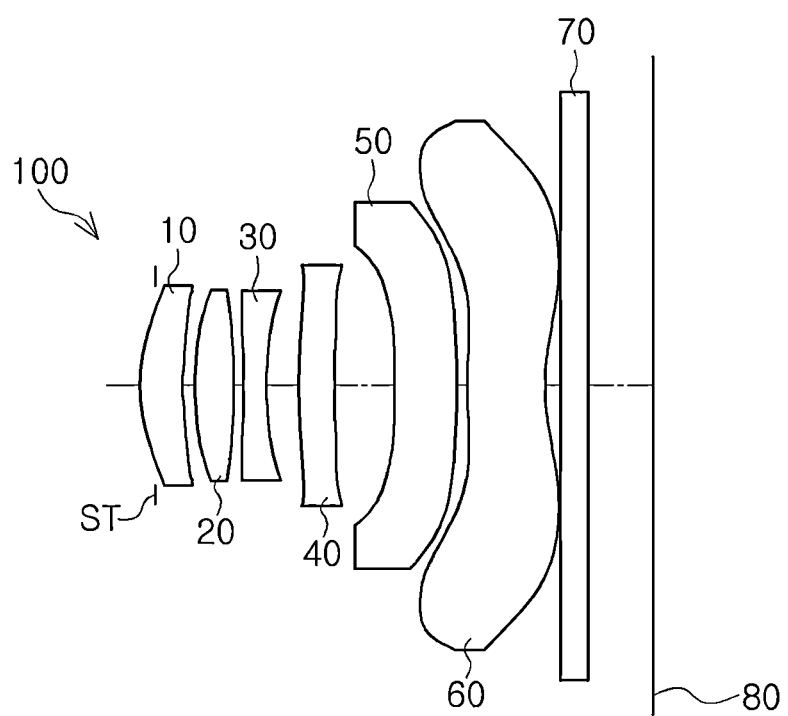
FIG. 22 is a configuration diagram of a lens module according to another exemplary embodiment of the present disclosure.
Figure 23:
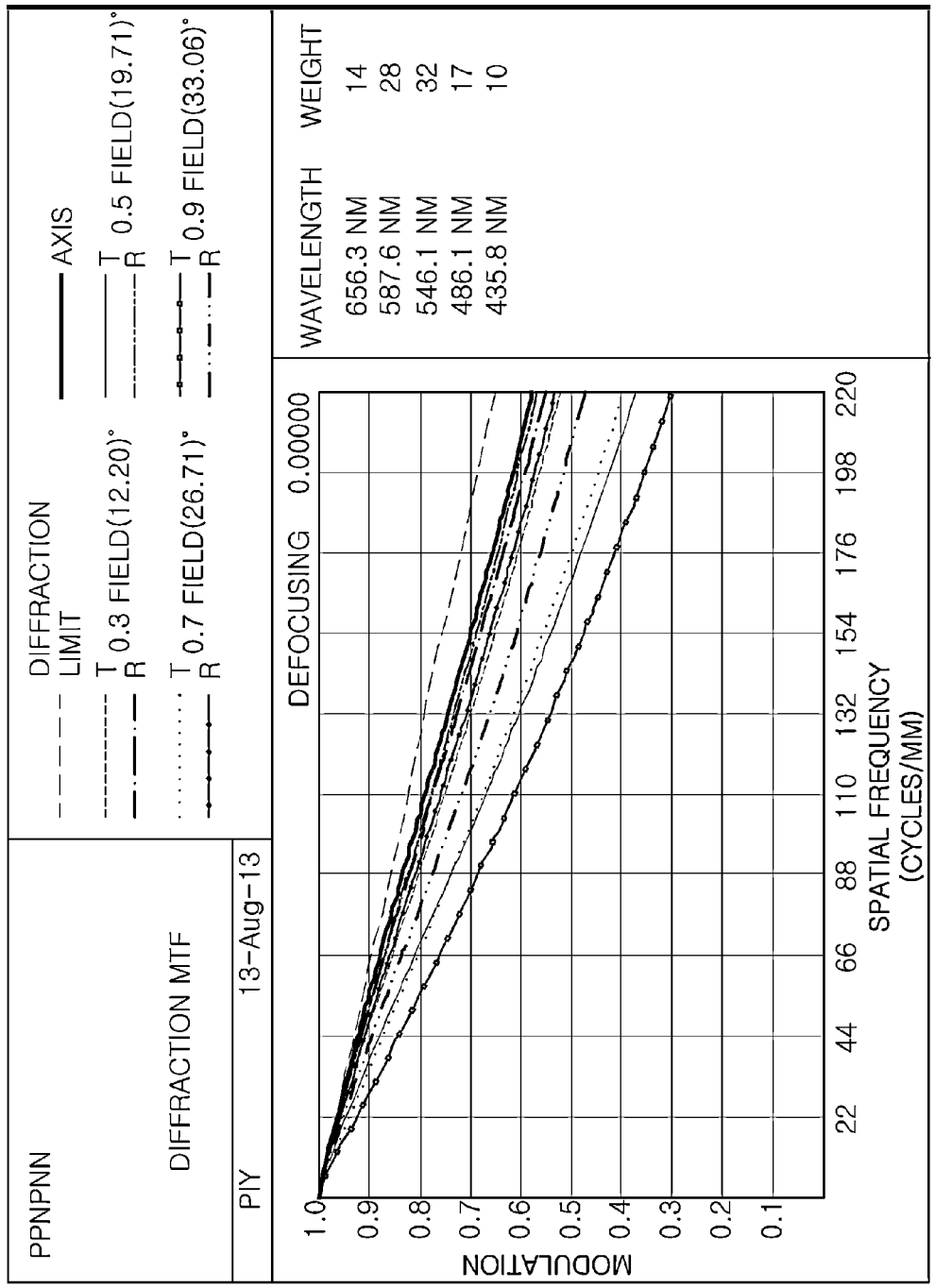
FIG. 23 is a curve showing an MTF of the lens module illustrated in FIG. 22.
Figure 24:
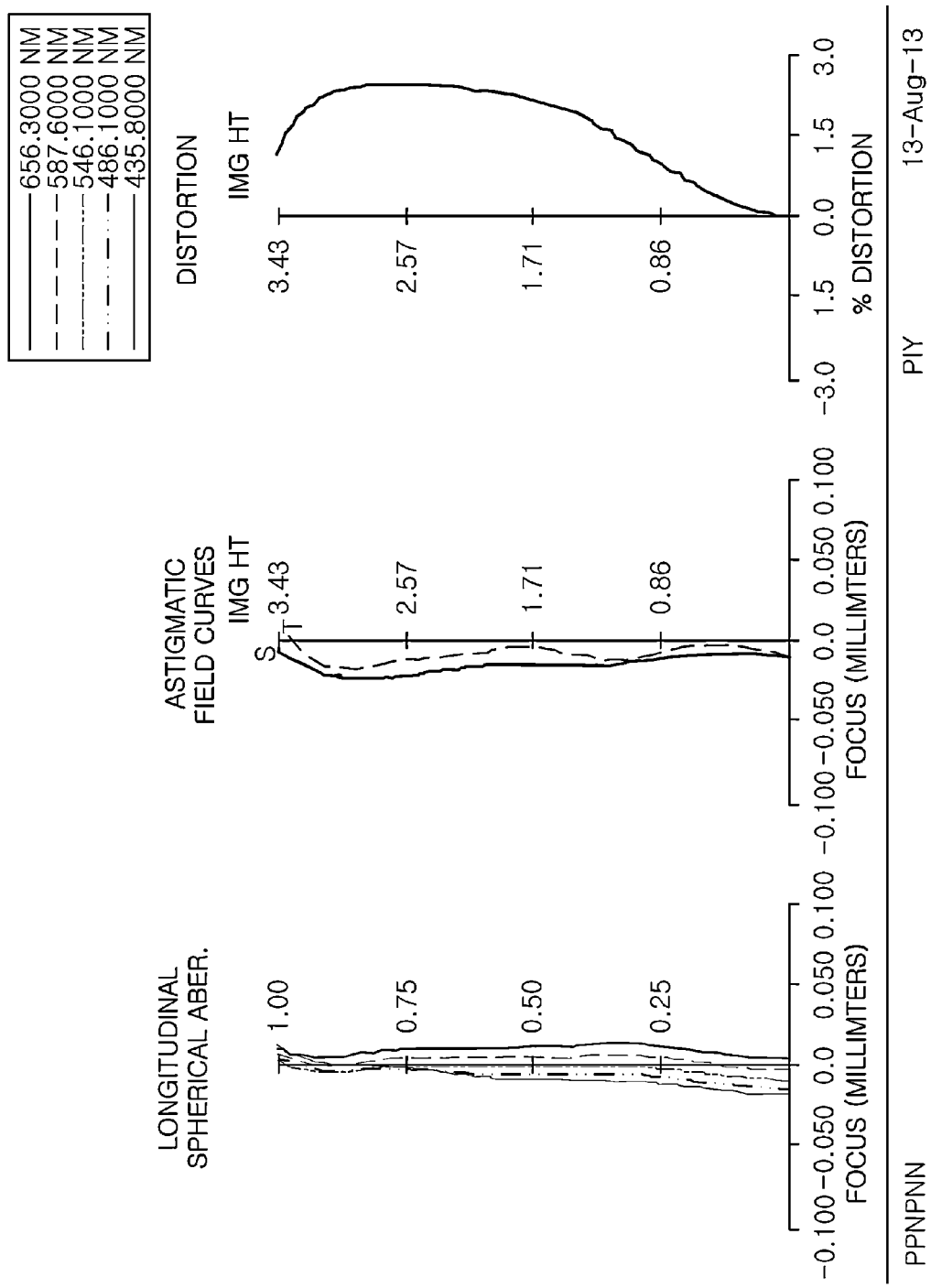
FIG. 24 is a curve showing coma aberration characteristics of the lens module illustrated in FIG. 22.

FIG. 1 is a configuration diagram of a lens module according to an exemplary embodiment of the present disclosure; FIG. 2 is a curve showing a modulation transfer function (MTF) of the lens module illustrated in FIG. 1; FIG. 3 is a curve showing aberration characteristics of the lens module illustrated in FIG. 1; FIG. 4 is a configuration diagram of a lens module according to another exemplary embodiment of the present disclosure; FIG. 5 is a curve showing an MTF of the lens module illustrated in FIG. 4; FIG. 6 is a curve showing aberration characteristics of the lens module illustrated in FIG. 4; FIG. 7 is a configuration diagram of a lens module according to another exemplary embodiment of the present disclosure; FIG. 8 is a curve showing an MTF of the lens module illustrated in FIG. 7; FIG. 9 is a curve showing aberration characteristics of the lens module illustrated in FIG. 7; FIG. 10 is a configuration diagram of a lens module according to another exemplary embodiment of the present disclosure; FIG. 11 is a curve showing an MTF of the lens module illustrated in FIG. 10; FIG. 12 is a curve showing aberration characteristics of the lens module illustrated in FIG. 10; FIG. 13 is a configuration diagram of a lens module according to another exemplary embodiment of the present disclosure; FIG. 14 is a curve showing an MTF of the lens module illustrated in FIG. 13; FIG. 15 is a curve showing aberration characteristics of the lens module illustrated in FIG. 13; FIG. 16 is a configuration diagram of a lens module according to another exemplary embodiment of the present disclosure; FIG. 17 is a curve showing an MTF of the lens module illustrated in FIG. 16; FIG. 18 is a curve showing aberration characteristics of the lens module illustrated in FIG. 16; FIG. 19 is a configuration diagram of a lens module according to another exemplary embodiment of the present disclosure; FIG. 20 is a curve showing an MTF of the lens module illustrated in FIG. 19; FIG. 21 is a curve showing coma aberration characteristics of the lens module illustrated in FIG. 19; FIG. 22 is a configuration diagram of a lens module according to another exemplary embodiment of the present disclosure; FIG. 23 is a curve showing an MTF of the lens module illustrated in FIG. 22; and FIG. 24 is a curve showing coma aberration characteristics of the lens module illustrated in FIG. 22.

A lens module according to an exemplary embodiment of the present disclosure may include an optical system including six lenses. More specifically, the lens module may include a first lens, a second lens, a third lens, a fourth lens, a fifth lens, and a sixth lens. However, the lens module is not limited to including only six lenses, but may further include other components if necessary. For example, the lens module may include a stop for controlling an amount of light. In addition, the lens module may further include an infrared cut-off filter cutting off an infrared ray. Further, the lens module may further include an image sensor (that is, an imaging device) converting an image of a subject incident through an optical system into an electrical signal. Further, the lens module may further include an interval maintaining member adjusting an interval between lenses.

The first to sixth lenses configuring the optical system may be formed of a plastic material. In addition, at least one of the first to sixth lenses may have an aspheric surface. Further, the first to sixth lenses may have at least one aspheric surface. That is, at least one of first and second surfaces of the first to sixth lenses may be an aspheric surface.

In addition, the optical system including the first to sixth lenses may have F No. of 2.3 or less. In this case, a subject may be clearly photographed. For example, the lens module according to an exemplary embodiment of the present disclosure may clearly photograph an image of the subject even under a low illumination condition (for example, 100 lux or less).

In addition, the lens module according to an exemplary embodiment of the present disclosure may satisfy the following Conditional Equation 1.

$$0.3 < f12/f < 0.8 \quad \text{[Conditional Equation 1]}$$

In Conditional Equation 1, f12 may indicate the sum of focal lengths of the first and second lenses and f may indicate an overall focal length of the optical system including the first to sixth lenses.

The lens module satisfying the above Conditional Equation 1 may be advantageous for miniaturization. That is, it may be difficult for a lens module having a value less than a lower limit value of the above Conditional Equation 1 to correct spherical aberration since refractive power of an optical system is excessively large, and a lens module having a value exceeding an upper limit value of the above Conditional Equation 1 may be advantageous to correct aberration of an optical system, but it may be difficult to mount the lens module in a portable terminal.

In addition, the lens module according to an exemplary embodiment of the present disclosure may satisfy the following Conditional Equation 2.

$$(EPD/2)/f12 < 0.6 \quad \text{[Conditional Equation 2]}$$

In Conditional Equation 2, EPD may indicate an entrance pupil diameter.

The above Conditional Equation 2, which indicates a ratio between an entrance pupil diameter and the sum of focal lengths of the first and second lenses, may be a condition for securing an amount of light sufficient for a pixel size that is becoming small. That is, the lens module satisfying the above Conditional Equation 2 may implement a high resolution even in an imaging device having a small pixel size.

In addition, the lens module according to an exemplary embodiment of the present disclosure may satisfy the following Conditional Equation 3.

$$f5/f < -3.0 \quad \text{[Conditional Equation 3]}$$

In Conditional Equation 3, f5 may indicate a focal length of the fifth lens.

The above Conditional Equation 3, which indicates a ratio of the focal length of the fifth lens to the overall focal length of the optical system, may be a numerical limiting condition for limiting refractive power of the fifth lens.

More specifically, it may be difficult for a lens module having a value exceeding an upper limit value of the above Conditional Equation 3 to correct aberration since refractive power of the fifth lens is large.

In addition, the lens module according to an exemplary embodiment of the present disclosure may satisfy the following Conditional Equation 4.

$$|V1 - V5| > 25 \quad \text{[Conditional Equation 4]}$$

In Conditional Equation 4, V1 may indicate the Abbe number of the first lens and V5 may indicate the Abbe number of the fifth lens.

The above Conditional Equation 4 may be a condition defining materials of the first and fifth lenses. The above-mentioned condition needs to be satisfied in order to significantly decrease chromatic aberration of the optical system.

In addition, the lens module according to an exemplary embodiment of the present disclosure may satisfy the following Conditional Equation 5.

$$TTL/f < 1.4 \qquad \text{[Conditional Equation 5]}$$

In Conditional Equation 5, TTL may indicate a distance from a first surface (object-side surface) of the first lens to an image surface of the image sensor.

The above Conditional Equation 5 may be a condition for optimizing miniaturization of the lens module. More specifically, when the condition of the above Conditional Equation 5 is not satisfied, an overall length of the optical system may become large, such that it may be difficult to miniaturize the lens module.

In addition, the lens module according to an exemplary embodiment of the present disclosure may satisfy the following Conditional Equation 6.

$$0.5 < f1/f2 < 2.2 \qquad \text{[Conditional Equation 6]}$$

In Conditional Equation 6, f1 may indicate a focal length of the first lens and f2 may indicate a focal length of the second lens.

The above Conditional Equation 6 may indicate a ratio of a focal length of the first lens to a focal length of the second lens. It may be difficult for a lens module that is out of the above-mentioned numeral range to correct aberration since refractive power of the first or second lens is excessively large.

In addition, the lens module according to an exemplary embodiment of the present disclosure may satisfy the following Conditional Equation 7.

$$BFL/f > 0.15 \qquad \text{[Conditional Equation 7]}$$

In Conditional Equation 7, BFL may indicate a distance from a second surface (image-side surface) of the sixth lens to an image surface of the image sensor.

The above Conditional Equation 7, which indicates a ratio of BFL to an overall focal length, may be a condition for optimizing manufacturing of the lens module. That is, it may be difficult for a lens module that does not satisfy the above Conditional Equation 7 to be actually manufactured since a distance between the lens and the image surface is not secured.

In addition, the lens module according to an exemplary embodiment of the present disclosure may satisfy the following Conditional Equation 8.

$$r1/f > 0.2 \qquad \text{[Conditional Equation 8]}$$

In Conditional Equation 8, r1 may indicate a radius of curvature of the first surface (that is, object-side surface) of the first lens.

The above Conditional Equation 8 may be a condition for limiting a radius of curvature of the first lens. That is, a lens module that does not satisfy the above Conditional Equation 8 may be sensitive to a manufacturing tolerance since the radius of curvature of the first lens is excessively small. Therefore, it may be difficult for the lens module to exhibit predetermined optical performance.

In addition, the lens module according to an exemplary embodiment of the present disclosure may satisfy the following Conditional Equation 9.

$$(r5+r6)/(r5-r6) > (r7+r8)/(r7-r8) \qquad \text{[Conditional Equation 9]}$$

That is, in the lens module according to an exemplary embodiment of the present disclosure, a value of $(r5+r6)/(r5-r6) > (r7+r8)/(r7-r8)$ may be a positive value larger than 0.

In Conditional Equation 9, r5 and r6 may indicate radii of curvature of an object-side surface and an image-side surface of the third lens, respectively, and r7 and r8 may indicate radii of curvature of an object-side surface and an image-side surface of the fourth lens, respectively.

The above Conditional Equation 9 may be a condition for optimizing a shape of the fourth lens for the third lens.

Next, the first to sixth lenses configuring the optical system will be described.

The first lens may have positive refractive power. The first lens may have a shape in which a first surface thereof is convex and a second surface thereof is concave. For example, the first lens may have a meniscus shape in which it is convex toward an object. At least one or both of the first and second surfaces of the first lens may be an aspheric surface.

The second lens may have positive refractive power. The second lens may have a shape in which a first surface thereof is convex toward the object and a second surface thereof is convex toward the image. That is, the second lens may have a shape in which both surfaces thereof are convex. At least one or both of the first and second surfaces of the second lens may be an aspheric surface.

The second lens may have a size smaller than that of the first lens. More specifically, an effective diameter (that is, a diameter of a portion substantially refracting light) of the second lens may be smaller than that of the first lens.

The third lens may have negative refractive power. The third lens may have a shape in which a first surface thereof is concave and a second surface thereof is concave. That is, the third lens may have a shape in which both surfaces thereof are concave. At least one or both of the first and second surfaces of the third lens may be an aspheric surface.

The third lens may have a size smaller than that of the first or second lens. More specifically, an effective diameter (that is, a diameter of a portion substantially refracting light) of the third lens may be smaller than that of the first or second lens.

The fourth lens may have positive refractive power. The fourth lens may have a shape in which a first surface thereof is convex and a second surface thereof is convex or concave. At least one or both of the first and second surfaces of the fourth lens may be an aspheric surface.

The fourth lens may have a size larger than that of the third lens. More specifically, an effective diameter (that is, a diameter of a portion substantially refracting light) of the fourth lens may be larger than that of the third lens.

The fifth lens may have negative refractive power. The fifth lens may have a shape in which a first surface thereof is convex or concave and a second surface thereof is concave or convex. That is, the fifth lens may have a meniscus shape in which it is convex toward the object or have a meniscus shape in which it is convex toward the image. At least one or both of the first and second surfaces of the fifth lens may be an aspheric surface.

The fifth lens may have a size larger than that of the fourth lens. More specifically, an effective diameter (that is, a diameter of a portion substantially refracting light) of the fifth lens may be larger than that of the fourth lens.

The sixth lens may have a positive or negative refractive power. That is, a reflective power of the sixth lens may not be limited to a positive or negative refractive power. In addition, the sixth lens may have a point of inflection formed on at least one of the first and second surfaces thereof. For example, the sixth lens may have a shape in which the second surface thereof is concave at the center of an optical axis and becomes convex toward an edge thereof. In addition, at least one or both of the first and second surfaces of the sixth lens may be an aspheric surface.

Meanwhile, in the optical system according to an exemplary embodiment of the present disclosure, the first to sixth lenses may be disposed so that effective areas thereof become smaller from the first lens toward the third lens and become larger from the fourth lens toward the sixth lens. The optical system configured as described above may increase an amount of light incident to the image sensor to increase a resolution of the lens module.

The lens module configured as described above may significantly decrease aberration, which causes image quality deterioration, and may improve a resolution. In addition, the lens module configured as described above may be easy for lightness and be advantageous for decreasing a manufacturing cost.

A lens module according to an exemplary embodiment of the present disclosure will be described with reference to FIGS. 1 through 3.

The lens module according to an exemplary embodiment of the present disclosure may include an optical system including a first lens 10, a second lens 20, a third lens 30, a fourth lens 40, a fifth lens 50, and a sixth lens 60, and may further include an infrared cut-off filter 70, an image sensor 80, and a stop ST.

The following Table 1 shows radii of curvature of first and second surfaces of the respective lenses and thicknesses and distances of the respective lenses. In addition, in Table 1, Index may indicate refractive indices of the lenses, and Abbe Number may include the Abbe numbers. Further, the following Table 2 shows aspheric constants for Surface No. of the respective lenses.

In an exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a shape in which both surfaces thereof are convex. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to an exemplary embodiment may have a focal length of 4.70 mm.

The lens module configured as described above may have modulation transfer function (MTF) characteristics illustrated in FIG. 2 and aberration characteristics illustrated in FIG. 3.

A lens module according to another exemplary embodiment of the present disclosure will be described with reference to FIGS. 4 through 6.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 3 shows radii of curvature of first and second surfaces of the respective lenses and thicknesses and distances of the respective lenses. In addition, in Table 3, Index may indicate refractive indices of the lenses, and Abbe Number may include the Abbe numbers. Further, the following Table 4 shows aspheric constants for Surface Nos. of the respective lenses.

TABLE 1

| Surface No | Radius of Curvature | Thickness or Distance | Index | Abbe Number |
|---|---|---|---|---|
| 1 | 1.8370 | 0.419 | 1.547 | 56.1 |
| 2 | 3.9941 | 0.127 | | |
| 3 | 3.4902 | 0.396 | 1.547 | 56.1 |
| 4 | −8.7843 | 0.107 | | |
| 5 | −9.0262 | 0.230 | 1.646 | 23.3 |
| 6 | 3.9997 | 0.271 | | |
| 7 | 9.3993 | 0.405 | 1.646 | 23.3 |
| 8 | −34.7960 | 0.588 | | |
| 9 | −7.4680 | 0.631 | 1.646 | 23.3 |
| 10 | −7.7319 | 0.102 | | |
| 11 | 5.8141 | 0.844 | 1.537 | 55.7 |
| 12 | 1.9988 | 0.197 | | |
| 13 | Infinity | 0.300 | 1.517 | 64.1 |

TABLE 3

| Surface No | Radius of Curvature | Thickness or Distance | Index | Abbe Number |
|---|---|---|---|---|
| 1 | 1.9065 | 0.423 | 1.547 | 56.1 |
| 2 | 4.1815 | 0.147 | | |

TABLE 2

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.837 | 3.994 | 3.490 | −8.784 | −9.026 | 4.000 | 9.399 | −34.796 | −7.468 | −7.732 | 5.814 | 1.999 |
| Conic Constant (K) | −0.572 | 0.000 | 0.000 | −14.825 | −37.703 | 12.857 | 0.000 | 0.000 | 0.000 | −1.895 | −100.000 | −9.729 |
| 4-th Order Coefficient (A) | −0.014 | −0.050 | −0.031 | 0.030 | 0.062 | −0.013 | −0.067 | −0.033 | 0.049 | 0.077 | −0.072 | −0.047 |
| 6-th Order Coefficient (B) | −0.004 | 0.003 | 0.014 | −0.139 | −0.180 | −0.073 | −0.016 | −0.021 | −0.107 | −0.092 | −0.012 | 0.007 |
| 8-th Order Coefficient (C) | −0.041 | −0.003 | −0.018 | 0.170 | 0.324 | 0.199 | 0.068 | 0.040 | 0.046 | 0.038 | 0.011 | −0.001 |
| 10-th Order Coefficient (D) | 0.040 | 0.069 | 0.125 | −0.088 | −0.291 | −0.207 | −0.017 | 0.011 | −0.008 | −0.008 | −0.002 | 0.000 |
| 12-th Order Coefficient (E) | −0.013 | −0.039 | −0.082 | 0.007 | 0.111 | 0.081 | −0.013 | −0.011 | 0.000 | 0.001 | 0.000 | 0.000 |

TABLE 3-continued

| Surface No | Radius of Curvature | Thickness or Distance | Index | Abbe Number |
|---|---|---|---|---|
| 3 | 3.3844 | 0.407 | 1.547 | 56.1 |
| 4 | −11.9897 | 0.100 | | |
| 5 | −12.2907 | 0.243 | 1.646 | 23.3 |
| 6 | 4.0575 | 0.319 | | |
| 7 | 4.5008 | 0.426 | 1.646 | 23.3 |
| 8 | 8.8598 | 0.558 | | |
| 9 | −5.7685 | 0.788 | 1.646 | 23.3 |
| 10 | −7.3988 | 0.100 | | |
| 11 | 5.6092 | 0.832 | 1.537 | 55.7 |
| 12 | 2.1542 | 0.171 | | |
| 13 | Infinity | 0.300 | 1.517 | 64.1 |

TABLE 4

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.906 | 4.182 | 3.384 | −11.990 | −12.291 | 4.058 | 4.501 | 8.860 | −5.769 | −7.399 | 5.609 | 2.154 |
| Conic Constant (K) | −0.537 | 0.000 | 0.000 | −13.537 | −33.610 | 12.759 | 0.000 | 0.000 | 0.000 | 1.895 | −100.000 | −10.816 |
| 4-th Order Coefficient (A) | −0.013 | −0.041 | −0.025 | 0.031 | 0.056 | −0.028 | −0.069 | −0.033 | 0.012 | 0.045 | −0.045 | −0.035 |
| 6-th Order Coefficient (B) | −0.002 | −0.024 | −0.025 | −0.155 | −0.143 | −0.009 | 0.020 | 0.002 | −0.074 | −0.066 | −0.024 | 0.004 |
| 8-th Order Coefficient (C) | −0.030 | 0.053 | 0.072 | 0.219 | 0.246 | 0.071 | 0.025 | 0.030 | 0.028 | 0.028 | 0.014 | 0.000 |
| 10-th Order Coefficient (D) | 0.035 | 0.011 | 0.024 | −0.140 | −0.217 | −0.090 | −0.012 | 0.002 | −0.002 | −0.005 | −0.002 | 0.000 |
| 12-th Order Coefficient (E) | −0.012 | −0.018 | −0.040 | 0.028 | 0.082 | 0.043 | −0.003 | −0.006 | −0.001 | 0.000 | 0.000 | 0.000 |

In another exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.89 mm.

The lens module configured as described above may have modulation transfer function (MTF) characteristics illustrated in FIG. 5 and aberration characteristics illustrated in FIG. 6.

A lens module according to another exemplary embodiment of the present disclosure will be described with reference to FIGS. 7 through 9.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 5 shows radii of curvature of first and second surfaces of the respective lenses and thicknesses and distances of the respective lenses. In addition, in Table 5, Index may indicate refractive indices of the lenses, and Abbe Number may include the Abbe numbers. Further, the following Table 6 shows aspheric constants for Surface Nos. of the respective lenses.

TABLE 5

| Surface No | Radius of Curvature | Thickness or Distance | Index | Abbe Number |
|---|---|---|---|---|
| 1 | 1.9039 | 0.426 | 1.547 | 56.1 |
| 2 | 4.3047 | 0.134 | | |
| 3 | 3.4677 | 0.415 | 1.547 | 56.1 |
| 4 | −11.6118 | 0.100 | | |
| 5 | −11.8408 | 0.230 | 1.646 | 23.3 |
| 6 | 4.0502 | 0.305 | | |
| 7 | 5.8563 | 0.389 | 1.646 | 23.3 |
| 8 | 19.8185 | 0.601 | | |
| 9 | −7.9922 | 0.677 | 1.646 | 23.3 |
| 10 | −8.4192 | 0.100 | | |
| 11 | 5.6073 | 0.772 | 1.537 | 55.7 |
| 12 | 2.0748 | 0.156 | | |
| 13 | Infinity | 0.300 | 1.517 | 64.1 |

TABLE 6

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.904 | 4.305 | 3.468 | −11.612 | −11.841 | 4.050 | 5.856 | 19.818 | −7.992 | −8.419 | 5.607 | 2.075 |
| Conic Constant (K) | −0.569 | 0.000 | 0.000 | 14.825 | −37.703 | 12.716 | 0.000 | 0.000 | 0.000 | −1.895 | −100.000 | −9.729 |

TABLE 6-continued

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| 4-th Order Coefficient (A) | −0.013 | −0.039 | −0.023 | 0.036 | 0.065 | −0.016 | −0.068 | −0.038 | 0.026 | 0.058 | −0.061 | −0.044 |
| 6-th Order Coefficient (B) | −0.005 | −0.046 | −0.035 | −0.182 | −0.193 | −0.053 | 0.005 | 0.003 | −0.077 | −0.073 | −0.026 | 0.004 |
| 8-th Order Coefficient (C) | −0.028 | 0.100 | 0.103 | 0.272 | 0.339 | 0.127 | 0.014 | 0.002 | 0.027 | 0.029 | 0.017 | 0.000 |
| 10-th Order Coefficient (D) | 0.034 | −0.029 | −0.008 | −0.186 | −0.287 | −0.111 | 0.025 | 0.033 | −0.004 | −0.005 | −0.003 | 0.000 |
| 12-th Order Coefficient (E) | −0.012 | −0.005 | −0.029 | 0.042 | 0.100 | 0.037 | −0.021 | −0.015 | −0.001 | 0.000 | 0.000 | 0.000 |

In another exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.70 mm.

The lens module configured as described above may have modulation transfer function (MTF) characteristics illustrated in FIG. 8 and aberration characteristics illustrated in FIG. 9.

A lens module according to another exemplary embodiment of the present disclosure will be described with reference to FIGS. 10 through 12.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 7 shows radii of curvature of first and second surfaces of the respective lenses and thicknesses and distances of the respective lenses. In addition, in Table 7, Index may indicate refractive indices of the lenses, and Abbe Number may include the Abbe numbers. Further, the following Table 8 shows aspheric constants for Surface Nos. of the respective lenses.

TABLE 7

| Surface No | Radius of Curvature | Thickness or Distance | Index | Abbe Number |
|---|---|---|---|---|
| 1 | 1.9416 | 0.455 | 1.547 | 56.1 |
| 2 | 4.0102 | 0.177 | | |
| 3 | 3.2844 | 0.484 | 1.547 | 56.1 |
| 4 | −12.9679 | 0.100 | | |
| 5 | −12.7193 | 0.230 | 1.646 | 23.3 |
| 6 | 4.2285 | 0.313 | | |
| 7 | 4.3359 | 0.408 | 1.646 | 23.3 |
| 8 | 8.0214 | 0.487 | | |
| 9 | −16.5931 | 1.006 | 1.646 | 23.3 |
| 10 | −17.0252 | 0.100 | | |
| 11 | 5.8215 | 0.644 | 1.537 | 55.7 |
| 12 | 2.1282 | 0.157 | | |
| 13 | Infinity | 0.300 | 1.517 | 64.1 |

TABLE 8

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.942 | 4.010 | 3.284 | −12.968 | −12.719 | 4.228 | 4.336 | 8.021 | −16.593 | −17.025 | 5.822 | 2.128 |
| Conic Constant (K) | −0.421 | 0.000 | 0.000 | −14.825 | −37.703 | 12.594 | 0.000 | 0.000 | 0.000 | −1.895 | −100.000 | −9.729 |
| 4-th Order Coefficient (A) | −0.010 | −0.026 | −0.017 | 0.026 | 0.052 | −0.014 | −0.056 | −0.037 | −0.015 | 0.036 | −0.055 | −0.043 |
| 6-th Order Coefficient (B) | −0.001 | −0.023 | −0.013 | −0.123 | −0.125 | −0.012 | 0.016 | 0.002 | −0.042 | −0.036 | −0.004 | 0.005 |
| 8-th Order Coefficient (C) | −0.018 | 0.035 | 0.027 | 0.159 | 0.186 | 0.037 | 0.007 | 0.013 | 0.012 | 0.011 | 0.004 | 0.000 |
| 10-th Order Coefficient (D) | 0.017 | −0.001 | 0.021 | −0.096 | −0.141 | −0.043 | −0.005 | 0.000 | −0.002 | −0.002 | −0.001 | 0.000 |
| 12-th Order Coefficient (E) | −0.005 | −0.004 | −0.018 | 0.020 | 0.045 | 0.019 | −0.002 | −0.002 | 0.000 | 0.000 | 0.000 | 0.000 |

In another exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.70 mm.

The lens module configured as described above may have modulation transfer function (MTF) characteristics illustrated in FIG. 11 and aberration characteristics illustrated in FIG. 12.

A lens module according to another exemplary embodiment of the present disclosure will be described with reference to FIGS. 13 through 15.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 9 shows radii of curvature of first and second surfaces of the respective lenses and thicknesses and distances of the respective lenses. In addition, in Table 9, Index may indicate refractive indices of the lenses, and Abbe Number may include the Abbe numbers. Further, the following Table 10 shows aspheric constants for Surface Nos. of the respective lenses.

In another exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.70 mm.

The lens module configured as described above may have modulation transfer function (MTF) characteristics illustrated in FIG. 14 and aberration characteristics illustrated in FIG. 15.

A lens module according to another exemplary embodiment of the present disclosure will be described with reference to FIGS. 16 through 18.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 11 shows radii of curvature of first and second surfaces of the respective lenses and thicknesses and distances of the respective lenses. In addition, in Table 11, Index may indicate refractive indices of the lenses, and Abbe Number may include the Abbe numbers. Further, the following Table 12 shows aspheric constants for Surface Nos. of the respective lenses.

TABLE 9

| Surface No | Radius of Curvature | Thickness or Distance | Index | Abbe Number |
|---|---|---|---|---|
| 1 | 1.9511 | 0.447 | 1.547 | 56.1 |
| 2 | 3.8259 | 0.180 | | |
| 3 | 3.1640 | 0.515 | 1.547 | 56.1 |
| 4 | −12.9711 | 0.100 | | |
| 5 | −12.6655 | 0.230 | 1.646 | 23.3 |
| 6 | 4.2519 | 0.337 | | |
| 7 | 4.7051 | 0.483 | 1.646 | 23.3 |
| 8 | 7.9298 | 0.425 | | |
| 9 | −59.3401 | 0.800 | 1.646 | 23.3 |
| 10 | −204.0315 | 0.205 | | |
| 11 | 5.6370 | 0.741 | 1.537 | 55.7 |
| 12 | 2.2703 | 0.160 | | |
| 13 | Infinity | 0.300 | 1.517 | 64.1 |

TABLE 11

| Surface No | Radius of Curvature | Thickness or Distance | Index | Abbe Number |
|---|---|---|---|---|
| 1 | 1.9976 | 0.412 | 1.547 | 56.1 |
| 2 | 4.2581 | 0.119 | | |

TABLE 10

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.951 | 3.826 | 3.164 | −12.971 | −12.665 | 4.252 | 4.705 | 7.930 | −59.340 | −204.032 | 5.637 | 2.270 |
| Conic Constant (K) | −0.401 | 0.000 | 0.000 | −14.454 | −37.703 | 12.595 | 0.000 | 0.000 | 0.000 | −1.895 | −100.000 | −9.969 |
| 4-th Order Coefficient (A) | −0.010 | −0.024 | −0.015 | 0.024 | 0.049 | −0.011 | −0.049 | −0.030 | −0.006 | 0.028 | −0.046 | −0.034 |
| 6-th Order Coefficient (B) | 0.000 | −0.019 | −0.009 | −0.111 | −0.113 | −0.011 | 0.006 | −0.011 | −0.054 | −0.042 | −0.013 | 0.001 |
| 8-th Order Coefficient (C) | −0.016 | 0.024 | 0.016 | 0.134 | 0.160 | 0.029 | 0.012 | 0.023 | 0.018 | 0.014 | 0.007 | 0.000 |
| 10-th Order Coefficient (D) | 0.015 | 0.006 | 0.023 | −0.075 | −0.115 | −0.032 | −0.009 | −0.007 | −0.002 | −0.002 | −0.001 | 0.000 |
| 12-th Order Coefficient (E) | −0.004 | −0.005 | −0.015 | 0.014 | 0.035 | 0.013 | −0.001 | 0.000 | 0.000 | 0.000 | 0.000 | 0.000 |

TABLE 11-continued

| Surface No | Radius of Curvature | Thickness or Distance | Index | Abbe Number |
|---|---|---|---|---|
| 3 | 3.1073 | 0.367 | 1.547 | 56.1 |
| 4 | −18.6049 | 0.106 | | |
| 5 | −19.3043 | 0.231 | 1.646 | 23.3 |
| 6 | 4.0101 | 0.323 | | |
| 7 | 4.2758 | 0.348 | 1.547 | 56.1 |
| 8 | 8.6934 | 0.565 | | |
| 9 | −9.8976 | 0.844 | 1.646 | 23.3 |
| 10 | −10.2364 | 0.100 | | |
| 11 | 5.0430 | 0.877 | 1.537 | 55.7 |
| 12 | 1.9525 | 0.187 | | |
| 13 | Infinity | 0.300 | 1.517 | 64.1 |

TABLE 12

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.998 | 4.258 | 3.107 | −18.605 | −19.304 | 4.010 | 4.276 | 8.693 | −9.898 | −10.236 | 5.043 | 1.952 |
| Conic Constant (K) | −0.622 | 0.000 | 0.000 | −14.825 | −37.703 | 12.678 | 0.000 | 0.000 | 0.000 | −1.895 | −100.000 | −9.729 |
| 4-th Order Coefficient (A) | −0.015 | −0.042 | −0.016 | 0.037 | 0.060 | −0.017 | −0.065 | −0.028 | 0.025 | 0.031 | −0.062 | −0.032 |
| 6-th Order Coefficient (B) | −0.005 | −0.050 | −0.060 | −0.198 | −0.184 | −0.041 | −0.009 | −0.025 | −0.077 | −0.048 | −0.029 | −0.001 |
| 8-th Order Coefficient (C) | −0.031 | 0.105 | 0.123 | 0.304 | 0.372 | 0.140 | 0.060 | 0.037 | 0.030 | 0.015 | 0.018 | 0.001 |
| 10-th Order Coefficient (D) | 0.042 | −0.013 | 0.020 | −0.201 | −0.364 | −0.167 | −0.024 | 0.013 | −0.009 | −0.002 | −0.003 | 0.000 |
| 12-th Order Coefficient (E) | −0.015 | −0.018 | −0.057 | 0.038 | 0.142 | 0.071 | −0.004 | −0.011 | 0.001 | 0.000 | 0.000 | 0.000 |

In another exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.70 mm.

The lens module configured as described above may have modulation transfer function (MTF) characteristics illustrated in FIG. 17 and aberration characteristics illustrated in FIG. 18.

A lens module according to another exemplary embodiment of the present disclosure will be described with reference to FIGS. 19 through 21.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 13 shows radii of curvature of first and second surfaces of the respective lenses and thicknesses and distances of the respective lenses. In addition, in Table 13, Index may indicate refractive indices of the lenses, and Abbe Number may include the Abbe numbers. Further, the following Table 14 shows aspheric constants for Surface Nos. of the respective lenses.

TABLE 13

| Surface No | Radius of Curvature | Thickness or Distance | Index | Abbe Number |
|---|---|---|---|---|
| 1 | 1.8516 | 0.381 | 1.547 | 56.1 |
| 2 | 2.8193 | 0.114 | | |
| 3 | 2.5548 | 0.383 | 1.547 | 56.1 |
| 4 | −34.5747 | 0.100 | | |
| 5 | −36.3269 | 0.230 | 1.646 | 23.3 |
| 6 | 4.0827 | 0.396 | | |
| 7 | 3.7529 | 0.380 | 1.547 | 56.1 |
| 8 | 5.4126 | 0.542 | | |
| 9 | 44.8460 | 0.840 | 1.646 | 23.3 |
| 10 | 41.6460 | 0.159 | | |
| 11 | 5.6646 | 0.850 | 1.537 | 55.7 |
| 12 | 2.1678 | 0.159 | | |
| 13 | Infinity | 0.300 | 1.519 | 64.2 |

TABLE 14

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 1.852 | 2.819 | 2.555 | −34.575 | −36.327 | 4.083 | 3.753 | 5.413 | 44.846 | 41.646 | 5.665 | 2.168 |
| Conic Constant (K) | −0.430 | 0.000 | 0.000 | −14.825 | −37.703 | 12.450 | 0.000 | 0.000 | 0.000 | −1.895 | −100.000 | −9.729 |

TABLE 14-continued

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| 4-th Order Coefficient (A) | −0.010 | −0.035 | −0.013 | 0.029 | 0.032 | −0.023 | −0.062 | −0.047 | −0.009 | −0.006 | −0.089 | −0.040 |
| 6-th Order Coefficient (B) | −0.004 | −0.050 | −0.053 | −0.113 | −0.068 | 0.032 | 0.037 | 0.011 | −0.048 | −0.024 | −0.007 | 0.003 |
| 8-th Order Coefficient (C) | −0.020 | 0.068 | 0.064 | 0.120 | 0.116 | −0.017 | 0.000 | 0.017 | 0.020 | 0.008 | 0.011 | 0.000 |
| 10-th Order Coefficient (D) | 0.030 | 0.034 | 0.071 | −0.046 | −0.129 | −0.027 | −0.007 | −0.004 | −0.007 | −0.001 | −0.002 | 0.000 |
| 12-th Order Coefficient (E) | −0.013 | −0.039 | −0.065 | −0.003 | 0.063 | 0.029 | 0.001 | −0.001 | 0.001 | 0.000 | 0.000 | 0.000 |

In another exemplary embodiment of the present disclosure, the first lens 10 may have positive refractive power and may have a shape in which the first surface thereof is convex and the second surface is concave. The second lens 20 may have a positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the object. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.70 mm.

The lens module configured as described above may have modulation transfer function (MTF) characteristics illustrated in FIG. 20 and aberration characteristics illustrated in FIG. 21.

A lens module according to another exemplary embodiment of the present disclosure will be described with reference to FIGS. 22 through 24.

The lens module according to another exemplary embodiment of the present disclosure may include an optical system including a first lens 10, a second lens 20, a third lens 30, a fourth lens 40, a fifth lens 50, and a sixth lens 60, and may further include an infrared cut-off filter, an image sensor, and a stop ST.

The following Table 15 shows radii of curvature of first and second surfaces of the respective lenses and thicknesses and distances of the respective lenses. In addition, in Table 15, Index may indicate refractive indices of the lenses, and Abbe Number may include the Abbe numbers. Further, the following Table 16 shows aspheric constants for Surface Nos. of the respective lenses.

TABLE 15

| Surface No | Radius of Curvature | Thickness or Distance | Index | Abbe Number |
|---|---|---|---|---|
| 1 | 2.0000 | 0.440 | 1.547 | 56.1 |
| 2 | 4.5795 | 0.128 | | |
| 3 | 3.2825 | 0.398 | 1.547 | 56.1 |
| 4 | −11.1606 | 0.100 | | |
| 5 | −11.3828 | 0.239 | 1.646 | 23.3 |
| 6 | 4.0296 | 0.337 | | |
| 7 | 5.2754 | 0.376 | 1.646 | 23.3 |
| 8 | 16.1182 | 0.619 | | |
| 9 | −8.1255 | 0.641 | 1.646 | 23.3 |
| 10 | −10.5344 | 0.110 | | |
| 11 | 5.7293 | 0.803 | 1.537 | 55.7 |
| 12 | 2.0678 | 0.156 | | |
| 13 | Infinity | 0.300 | 1.517 | 64.1 |

TABLE 16

| | Surface No. | | | | | | | | | | | |
|---|---|---|---|---|---|---|---|---|---|---|---|---|
| | 2 | 3 | 4 | 5 | 6 | 7 | 8 | 9 | 10 | 11 | 12 | 13 |
| Y Radius | 2.000 | 4.579 | 3.283 | −11.161 | −11.383 | 4.030 | 5.275 | 16.118 | −8.125 | −10.534 | 5.729 | 2.068 |
| Conic Constant (K) | −0.648 | 0.000 | 0.000 | −14.825 | −37.703 | 12.673 | 0.000 | 0.000 | 0.000 | −1.895 | −100.000 | −9.729 |
| 4-th Order Coefficient (A) | −0.016 | −0.041 | −0.019 | 0.040 | 0.067 | −0.016 | −0.066 | −0.039 | 0.027 | 0.066 | −0.062 | −0.047 |
| 6-th Order Coefficient (B) | −0.006 | −0.053 | −0.053 | −0.216 | −0.207 | −0.047 | 0.000 | −0.003 | −0.084 | −0.085 | −0.021 | 0.006 |
| 8-th Order Coefficient (C) | −0.027 | 0.122 | 0.130 | 0.338 | 0.391 | 0.134 | 0.039 | 0.020 | 0.026 | 0.034 | 0.014 | 0.000 |
| 10-th Order Coefficient (D) | 0.035 | −0.044 | −0.010 | −0.235 | −0.358 | −0.147 | −0.007 | 0.020 | 0.001 | −0.006 | −0.002 | 0.000 |
| 12-th Order Coefficient (E) | −0.012 | −0.003 | −0.039 | 0.053 | 0.132 | 0.061 | −0.009 | −0.012 | −0.002 | 0.000 | 0.000 | 0.000 |

In another exemplary embodiment of the present disclosure, the first lens 10 may have positive refractive power and may have a shape in which the first surface thereof is convex and the second surface is concave. The second lens 20 may have positive refractive power and may have a shape in which both surfaces thereof are convex. The third lens 30 may have negative refractive power and may have a shape in which both surfaces thereof are concave. The fourth lens 40 may have positive refractive power and may have a meniscus shape in which it is convex toward the object. The fifth lens 50 may have negative refractive power and may have a meniscus shape in which it is convex toward the image. The sixth lens 60 may have negative refractive power and may have a shape in which a first surface thereof is convex and a second surface thereof is concave. Further, the sixth lens 60 may have a point of inflection formed on the second surface thereof. The stop ST may be disposed before the first lens 10. The optical system according to another exemplary embodiment may have a focal length of 4.70 mm.

The lens module configured as described above may have modulation transfer function (MTF) characteristics illustrated in FIG. 23 and aberration characteristics illustrated in FIG. 24.

TABLE 17

| Conditional Equation | Exemplary embodiment 1 | Exemplary embodiment 2 | Exemplary embodiment 3 | Exemplary embodiment 4 | Exemplary embodiment 5 | Exemplary embodiment 6 | Exemplary embodiment 7 | Exemplary embodiment 8 |
|---|---|---|---|---|---|---|---|---|
| $0.3 < f12/f < 0.8$ | 0.59 | 0.59 | 0.61 | 0.63 | 0.63 | 0.63 | 0.66 | 0.60 |
| $(EPD/2)/f12 < 0.6$ | 0.38 | 0.36 | 0.38 | 0.41 | 0.42 | 0.35 | 0.34 | 0.37 |
| $f5/f < -3.0$ | −1182.5 | −10.2 | −137.3 | −2499.0 | −27.6 | −4337.4 | −214.3 | −13.1 |
| $|v1 - v5| > 25.0$ | 32.8 | 32.8 | 32.8 | 32.8 | 32.8 | 32.8 | 32.8 | 32.8 |
| $OAL/f < 1.4$ | 1.13 | 1.12 | 1.13 | 1.16 | 1.17 | 1.15 | 1.15 | 1.13 |
| $0.5 < f1/f2 < 2.2$ | 1.26 | 1.23 | 1.19 | 1.32 | 1.43 | 1.32 | 1.98 | 1.40 |
| $BFL/f > 0.15$ | 0.25 | 0.23 | 0.25 | 0.23 | 0.22 | 0.23 | 0.22 | 0.24 |
| $r1/f > 0.2$ | 0.39 | 0.39 | 0.41 | 0.41 | 0.42 | 0.43 | 0.39 | 0.43 |
| $(r5 + r6)/(r5 - r6) - (r7 + r8)/(r7 - r8) > 0$ | 0.96 | 3.57 | 2.33 | 3.85 | 4.42 | 3.59 | 6.32 | 2.45 |

Although the optical systems according to exemplary embodiments of the present disclosure described above have some different characteristics as illustrated in Table 17, they may satisfy all of Conditional Equations 1 to 9.

As set forth above, according to exemplary embodiments of the present disclosure, aberration may be easily corrected and a high resolution may be implemented.

Further, according to exemplary embodiments of the present disclosure, since an optical system may be configured only using plastic lenses, the optical system may become light and a cost required for manufacturing the lens module may be decreased.

While exemplary embodiments have been illustrated and described above, it will be apparent to those skilled in the art that modifications and variations could be made without departing from the spirit and scope of the present disclosure as defined by the appended claims.

What is claimed is:

1. A lens module comprising:
   a first lens having positive refractive power;
   a second lens having positive refractive power;
   a third lens having a shape in which an object-side surface thereof is concave;
   a fourth lens having refractive power of which an object-side surface is convex;
   a fifth lens having negative refractive power; and
   a sixth lens having negative refractive power, having a shape in which an image-side surface thereof is concave, and having at least one point of inflection formed on the image-side surface thereof.

2. The lens module of claim 1, wherein an optical system including the first to sixth lenses satisfies Conditional Equation 1:

$$0.3 < f12/f0.8 \qquad \text{[Conditional Equation 1]}$$

where f12 is a composite focal length of the first and second lenses and f indicates an overall focal length of the optical system.

3. The lens module of claim 1, wherein an optical system including the first to sixth lenses satisfies Conditional Equation 2:

$$(EPD/2)/f12 < 0.6 \qquad \text{[Conditional Equation 2]}$$

where EPD indicates an entrance pupil diameter and f12 is a composite focal length of the first and second lenses.

4. The lens module of claim 1, wherein an optical system including the first to sixth lenses satisfies Conditional Equation 3:

$$f5/f < -3.0 \qquad \text{[Conditional Equation 3]}$$

where f5 indicates a focal length of the fifth lens and f indicates an overall focal length of the optical system.

5. The lens module of claim 1, wherein an optical system including the first to sixth lenses satisfies Conditional Equation 4:

$$|V1 - V5| > 25 \qquad \text{[Conditional Equation 4]}$$

where V1 indicates an Abbe number of the first lens, and V5 indicates an Abbe number of the fifth lens.

6. The lens module of claim 1, wherein an optical system including the first to sixth lenses satisfies Conditional Equation 5:

$$TTL/f < 1.4 \qquad \text{[Conditional Equation 5]}$$

where TTL indicates a distance from an object-side surface of the first lens to an image surface.

7. The lens module of claim 1, wherein an optical system including the first to sixth lenses satisfies Conditional Equation 6:

$$0.5 < f1/f2 < 2.2 \qquad \text{[Conditional Equation 6]}$$

where f1 indicates a focal length of the first lens and f2 indicates a focal length of the second lens.

8. The lens module of claim 1, wherein an optical system including the first to sixth lenses satisfies Conditional Equation 7:

$$BFL/f > 0.15 \qquad \text{[Conditional Equation 7]}$$

where BFL indicates a distance from the image-side surface of the sixth lens to an image surface and f indicates an overall focal length of the optical system.

9. The lens module of claim 1, wherein an optical system including the first to sixth lenses satisfies Conditional Equation 8:

$$r1/f>0.2 \quad \text{[Conditional Equation 8]}$$

where r1 indicates a radius of curvature of an object-side surface of the first lens and f indicates an overall focal length of the optical system.

10. The lens module of claim 1, wherein an optical system including the first to sixth lenses satisfies Conditional Equation 9:

$$(r5+r6)/(r5-r6)>(r7+r8)/(r7-r8) \quad \text{[Conditional Equation 9]}$$

where r5 and r6 indicate radii of curvature of the object-side surface and an image-side surface of the third lens, respectively, and r7 and r8 indicate radii of curvature of an object-side surface and an image-side surface of the fourth lens, respectively.

11. A lens module comprising:
a first lens having positive refractive power;
a second lens having positive refractive power;
a third lens having negative refractive power;
a fourth lens having refractive power and having a shape in which an object-side surface thereof is convex;
a fifth lens having negative refractive power; and
a sixth lens having negative refractive power, having a shape in which an image-side surface thereof is concave, and having at least one point of inflection formed on the image-side surface thereof.

12. The lens module of claim 11, wherein the first lens has a meniscus shape in which it is convex toward an object.

13. The lens module of claim 11, wherein the second lens has a shape in which both surfaces thereof are convex.

14. The lens module of claim 11, wherein the third lens has a shape in which both surfaces thereof are concave.

15. The lens module of claim 11, wherein the fourth lens has positive refractive power.

16. The lens module of claim 11, wherein the fifth lens has a meniscus shape in which it is convex toward an image.

17. The lens module of claim 11, wherein the sixth lens has a shape in which an object-side surface thereof is convex and the image-side surface thereof is concave.

18. The lens module of claim 11, wherein an optical system including the first to sixth lenses satisfies Conditional Equation 1:

$$0.3<f12/f<0.8 \quad \text{[Conditional Equation 1]}$$

where f12 is a composite focal length of the first and second lenses and f indicates an overall focal length of the optical system.

19. The lens module of claim 11, wherein an optical system including the first to sixth lenses satisfies Conditional Equation 2:

$$(EPD/2)/f12<0.6 \quad \text{[Conditional Equation 2]}$$

where EPD indicates an entrance pupil diameter and f12 is a composite focal length of the first and second lenses.

20. The lens module of claim 11, wherein an optical system including the first to sixth lenses satisfies Conditional Equation 3:

$$f5/f<-3.0 \quad \text{[Conditional Equation 3]}$$

where f5 indicates a focal length of the fifth lens and f indicates an overall focal length of the optical system.

21. The lens module of claim 11, wherein an optical system including the first to sixth lenses satisfies Conditional Equation 4:

$$|V1-V5|>25 \quad \text{[Conditional Equation 4]}$$

where V1 indicates an Abbe number of the first lens, and V5 indicates an Abbe number of the fifth lens.

22. The lens module of claim 11, wherein an optical system including the first to sixth lenses satisfies Conditional Equation 5:

$$TTL/f<1.4 \quad \text{[Conditional Equation 5]}$$

where TTL indicates a distance from an object-side surface of the first lens to an image surface.

23. The lens module of claim 11, wherein an optical system including the first to sixth lenses satisfies Conditional Equation 6:

$$0.5<f1/f2<2.2 \quad \text{[Conditional Equation 6]}$$

where f1 indicates a focal length of the first lens and f2 indicates a focal length of the second lens.

24. The lens module of claim 11, wherein an optical system including the first to sixth lenses satisfies Conditional Equation 7:

$$BFL/f>0.15 \quad \text{[Conditional Equation 7]}$$

where BFL indicates a distance from the image-side surface of the sixth lens to an image surface and f indicates an overall focal length of the optical system.

25. The lens module of claim 11, wherein an optical system including the first to sixth lenses satisfies Conditional Equation 8:

$$r1/f>0.2 \quad \text{[Conditional Equation 8]}$$

where r1 indicates a radius of curvature of an object-side surface of the first lens and f indicates an overall focal length of the optical system.

26. The lens module of claim 11, wherein an optical system including the first to sixth lenses satisfies Conditional Equation 9:

$$(r5+r6)/(r5-r6)>(r7+r8)/(r7-r8) \quad \text{[Conditional Equation 9]}$$

where r5 and r6 indicate radii of curvature of an object-side surface and an image-side surface of the third lens, respectively, and r7 and r8 indicate radii of curvature of the object-side surface and an image-side surface of the fourth lens, respectively.

* * * * *